US012399421B2

(12) United States Patent
Miura et al.

(10) Patent No.: US 12,399,421 B2
(45) Date of Patent: Aug. 26, 2025

(54) PROJECTOR

(71) Applicant: SONY GROUP CORPORATION, Tokyo (JP)

(72) Inventors: Koji Miura, Tokyo (JP); Kazumasa Kaneda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 255 days.

(21) Appl. No.: 17/917,128

(22) PCT Filed: Mar. 31, 2021

(86) PCT No.: PCT/JP2021/014035
§ 371 (c)(1),
(2) Date: Oct. 5, 2022

(87) PCT Pub. No.: WO2021/210410
PCT Pub. Date: Oct. 21, 2021

(65) Prior Publication Data
US 2023/0152679 A1    May 18, 2023

(30) Foreign Application Priority Data

Apr. 17, 2020 (JP) .................. 2020-074073

(51) Int. Cl.
*G03B 21/20* (2006.01)
*G02B 27/28* (2006.01)
*H04N 9/31* (2006.01)

(52) U.S. Cl.
CPC ....... *G03B 21/2073* (2013.01); *G02B 27/283* (2013.01); *G03B 21/2033* (2013.01);
(Continued)

(58) Field of Classification Search
CPC ............ G03B 21/2073; G03B 21/2033; G03B 21/208; G02B 27/283; H04N 9/3161; H04N 9/3167
(Continued)

(56) References Cited

U.S. PATENT DOCUMENTS

2011/0234928 A1* 9/2011 Masuda .................. G03B 21/14
349/8

FOREIGN PATENT DOCUMENTS

DE     10321709 A1 * 12/2004     ........... G02B 27/283
JP     09-185029 A     7/1997
(Continued)

OTHER PUBLICATIONS

Translation of DE10321709 (Year: 2024).*
(Continued)

*Primary Examiner* — Jerry L Brooks
(74) *Attorney, Agent, or Firm* — CHIP LAW GROUP

(57) ABSTRACT

A projector according to the present disclosure includes: an illumination optical system; a separator; a first light valve; a second light valve; and a projection optical system. The illumination optical system generates illumination light. The separator separates the illumination light from the illumination optical system into first illumination light and second illumination light. The first light valve is illuminated with the first illumination light separated by the separator and generates first image light. The second light valve is illuminated with the second illumination light separated by the separator and generates second image light. The first image light generated by the first light valve and the second image light generated by the second light valve enter the projection optical system through the separator. The projection optical system projects the first image light that has entered the projection optical system toward a first display region and
(Continued)

projects the second image light that has entered the projection optical system toward a second display region.

8 Claims, 25 Drawing Sheets

(52) U.S. Cl.
 CPC ......... *G03B 21/208* (2013.01); *H04N 9/3161* (2013.01); *H04N 9/3167* (2013.01)
(58) Field of Classification Search
 USPC .......................................................... 353/10
 See application file for complete search history.

(56) References Cited

FOREIGN PATENT DOCUMENTS

| | | |
|---|---|---|
| JP | 10-304284 A | 11/1998 |
| JP | 2005-084374 A | 3/2005 |
| JP | 2007-079542 A | 3/2007 |
| JP | 2010-519569 A | 6/2010 |
| JP | 2015-007774 A | 1/2015 |
| JP | 2016-188908 A | 11/2016 |
| JP | 2017-037104 A | 2/2017 |

OTHER PUBLICATIONS

International Search Report and Written Opinion of PCT Application No. PCT/JP2021/014035, issued on Jun. 8, 2021, 10 pages of ISRWO.

\* cited by examiner

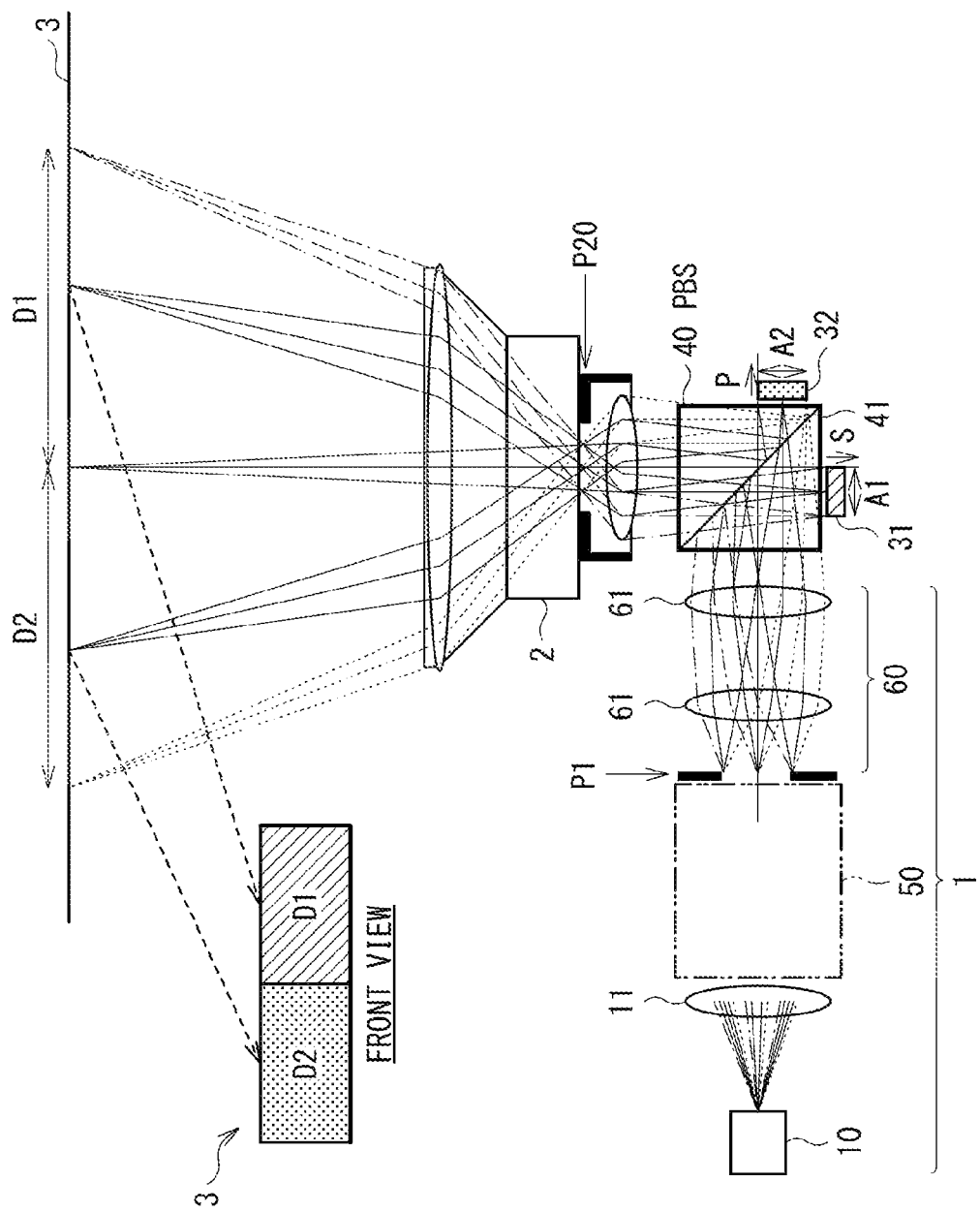
[FIG. 1]

[FIG. 2]
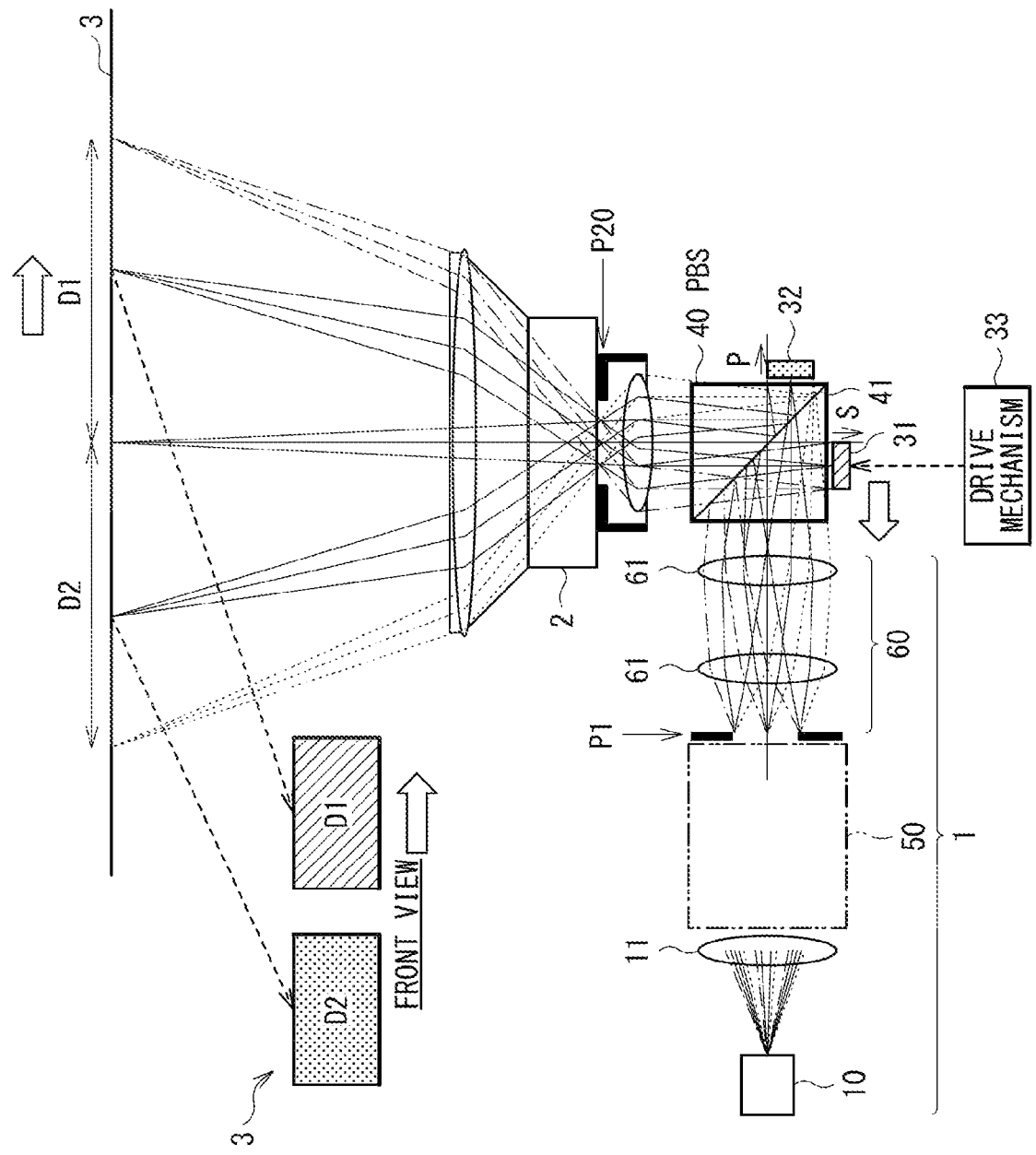

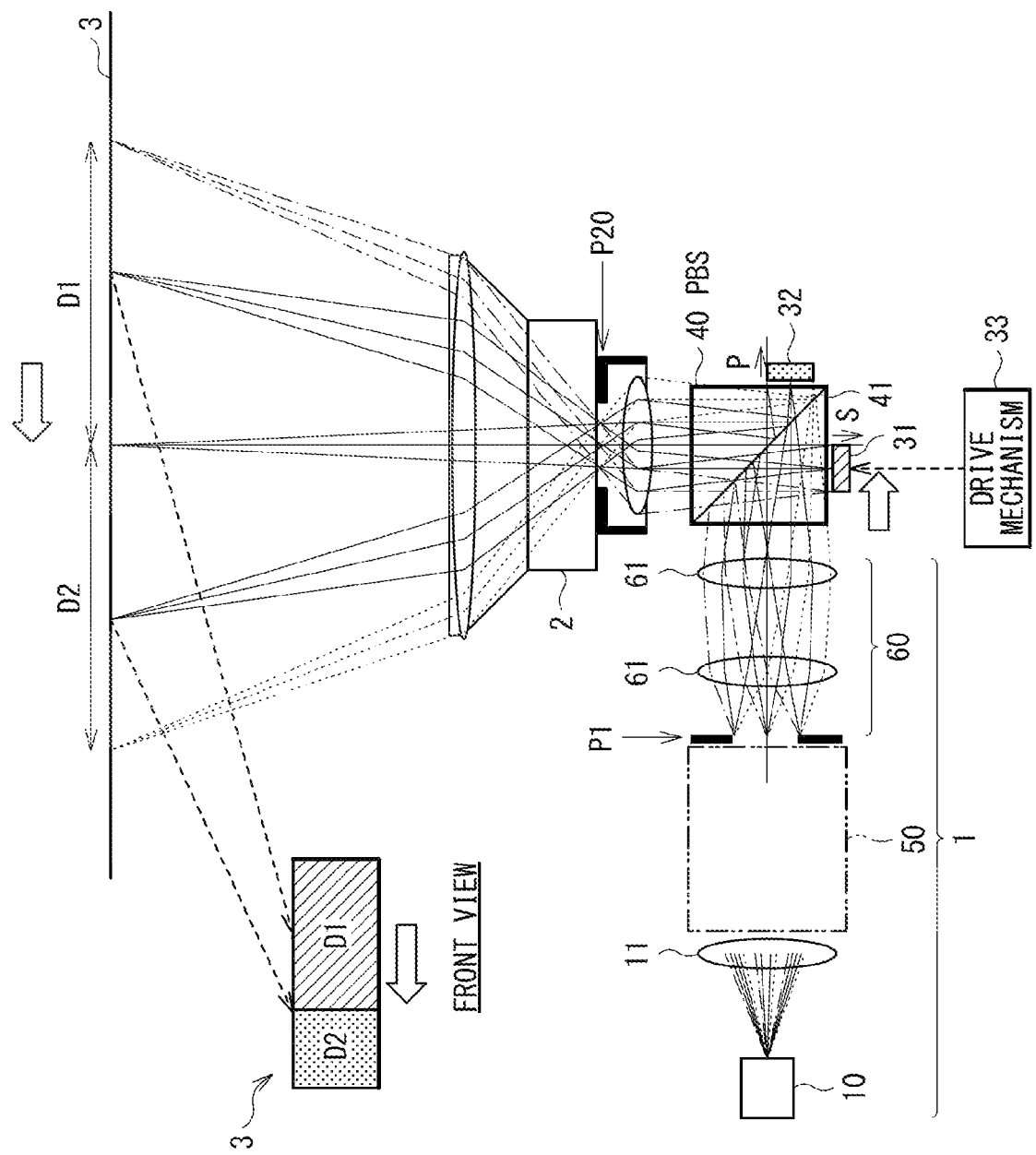

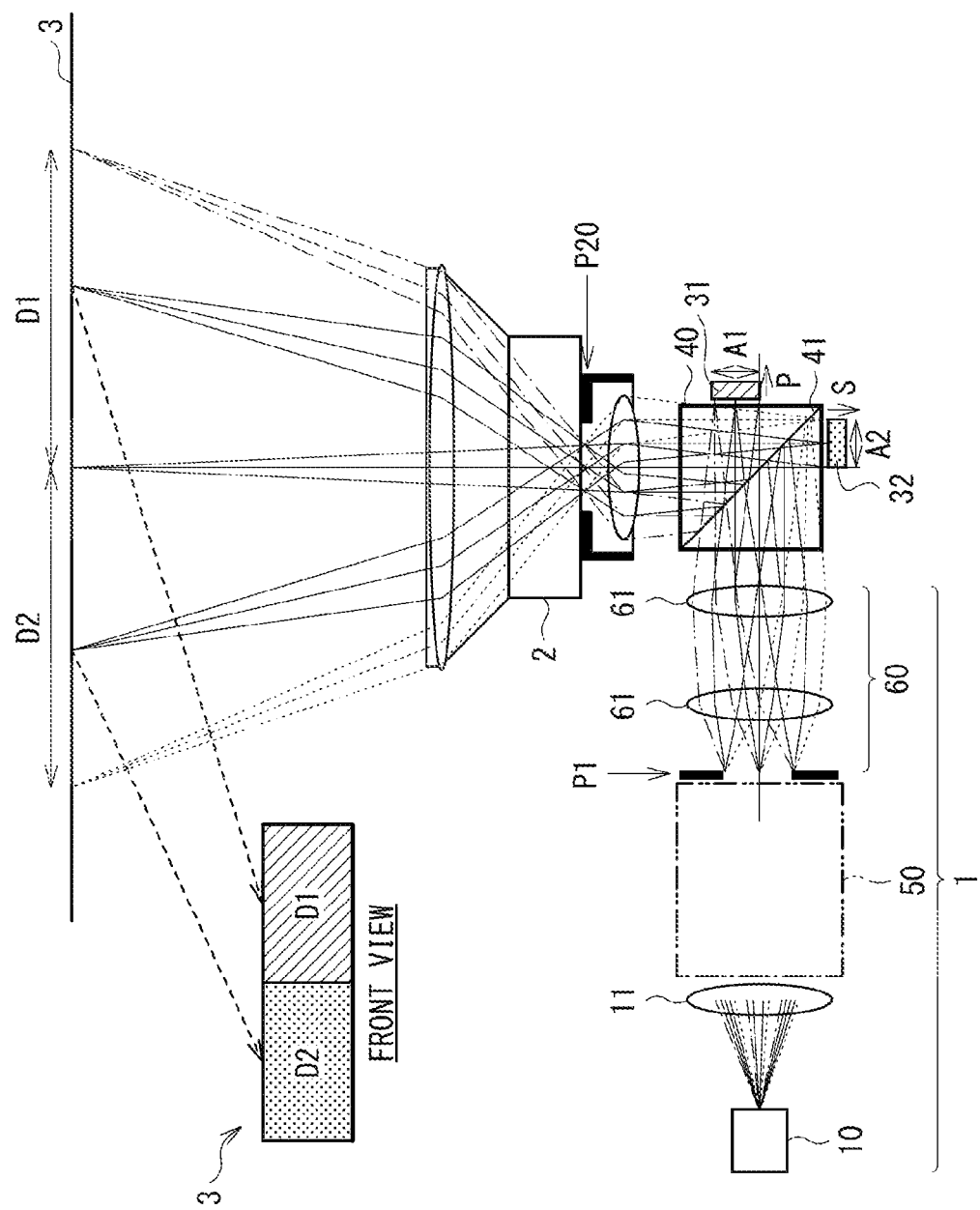
[FIG. 4]

[FIG. 5]
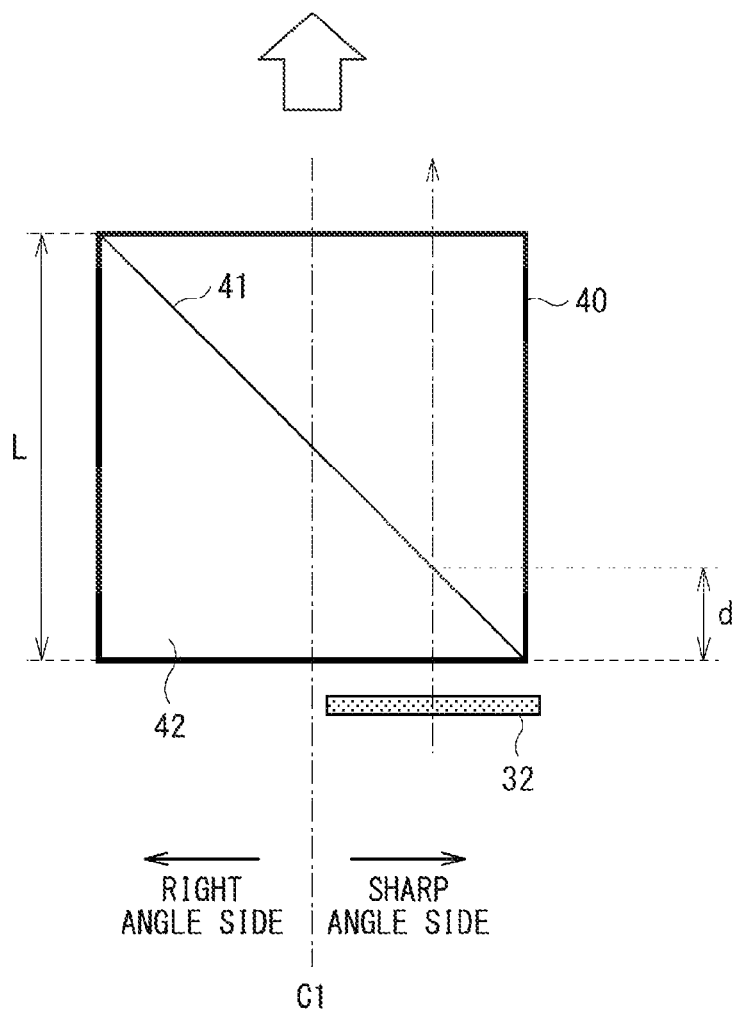

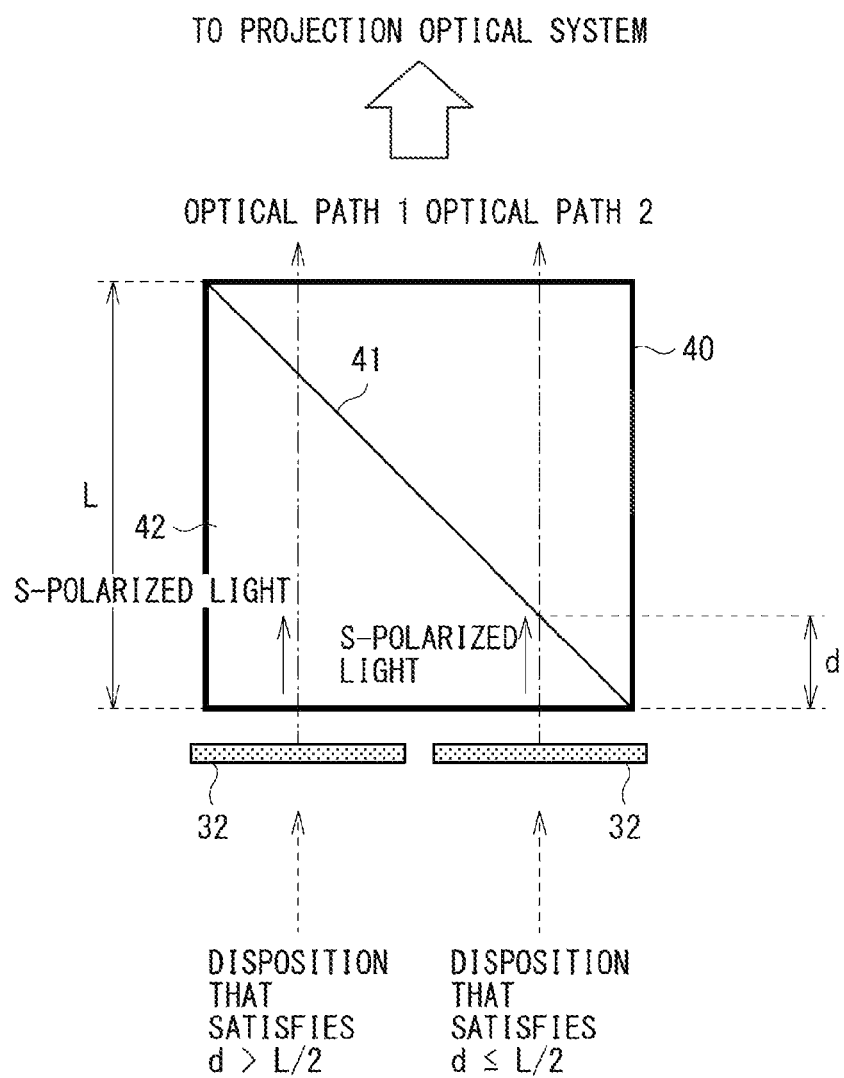

[FIG. 7]
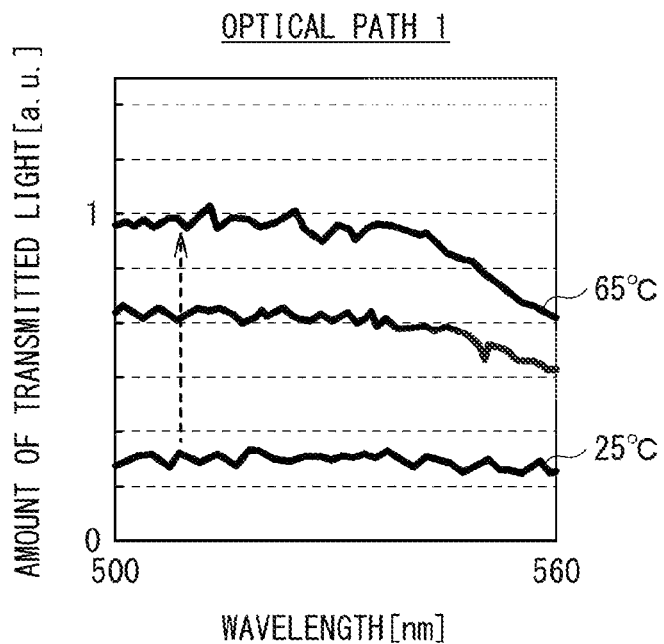
[FIG. 8]
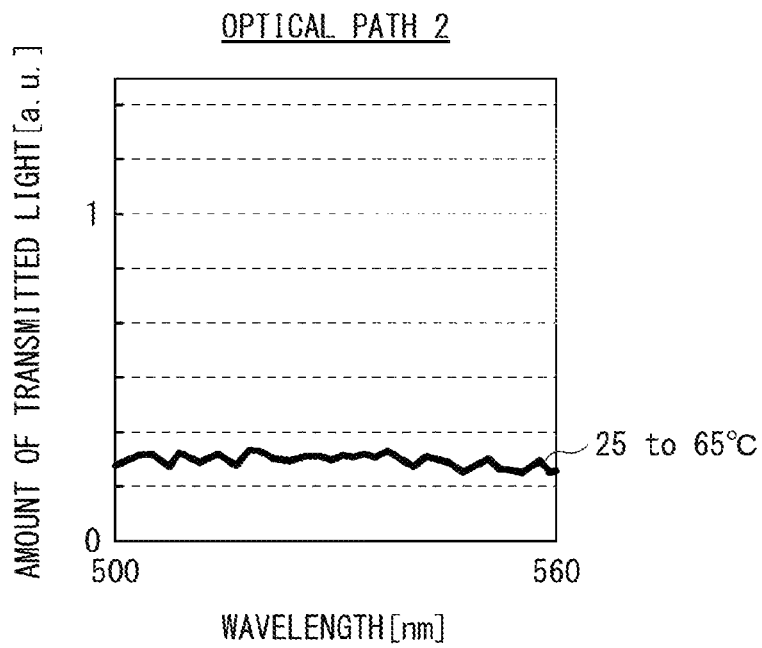

[FIG. 9]
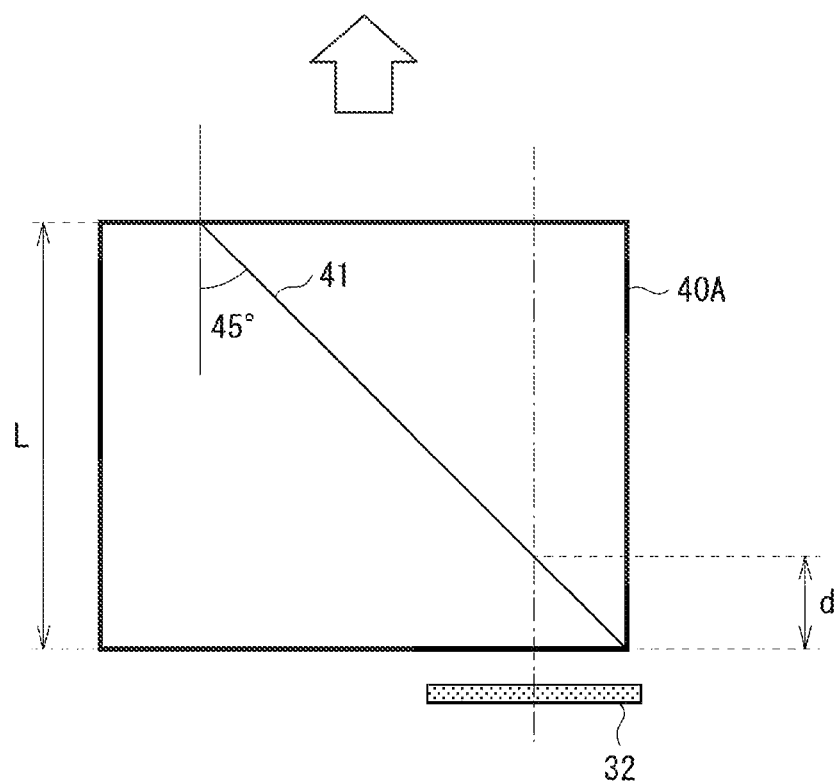

[FIG. 10]
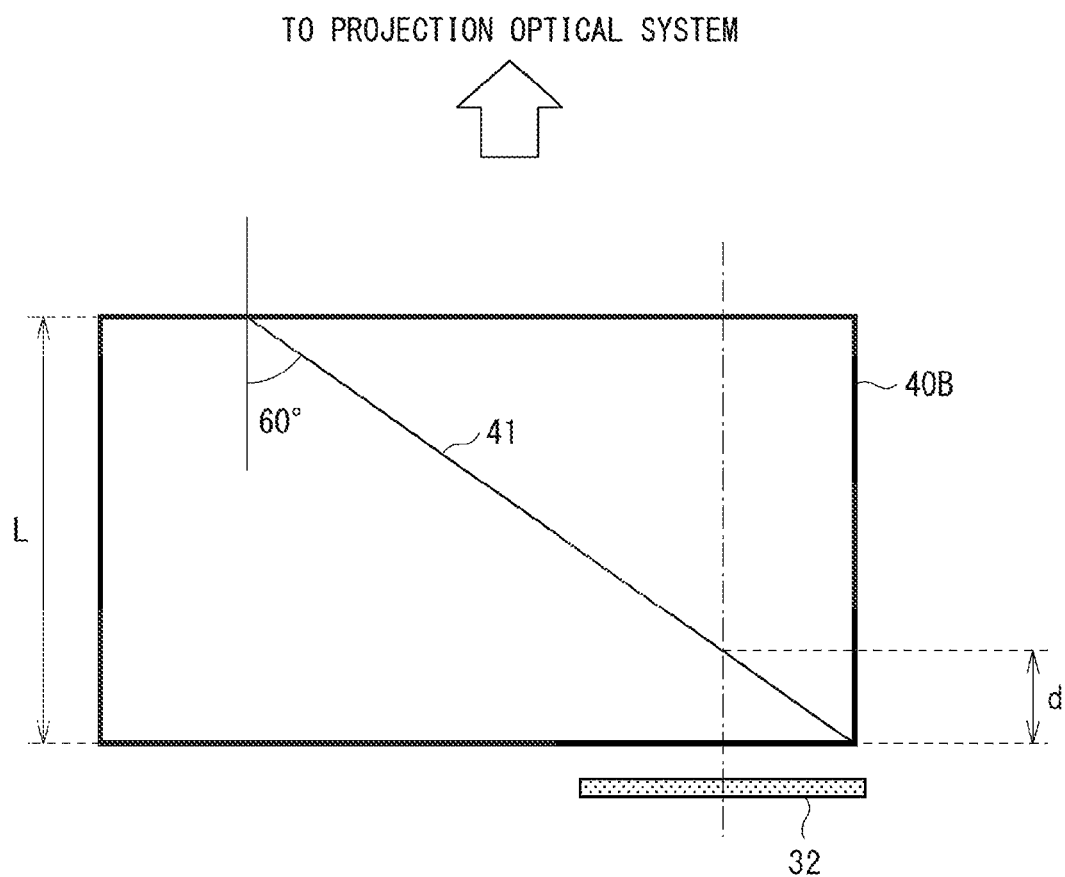

[FIG. 11]
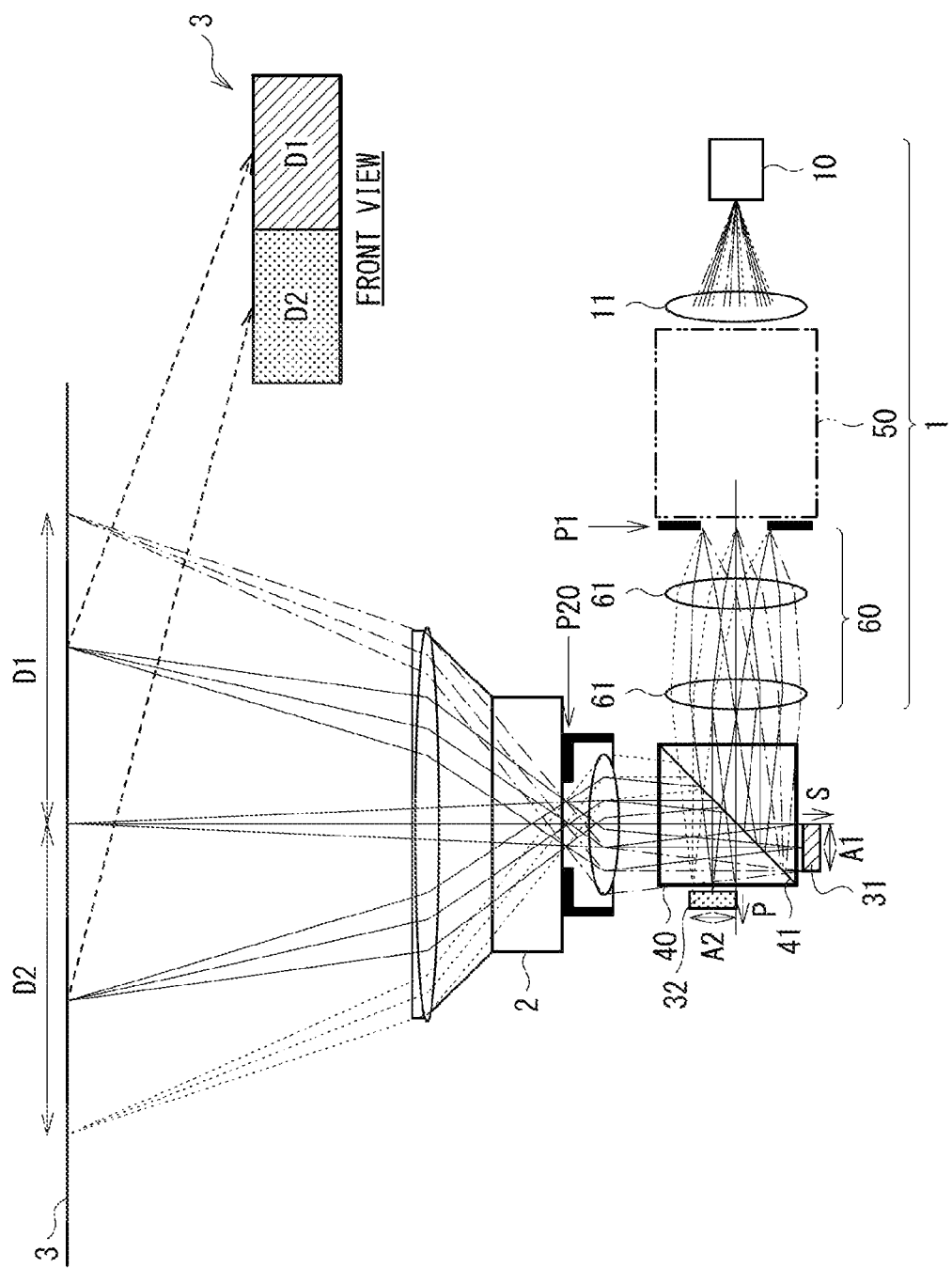

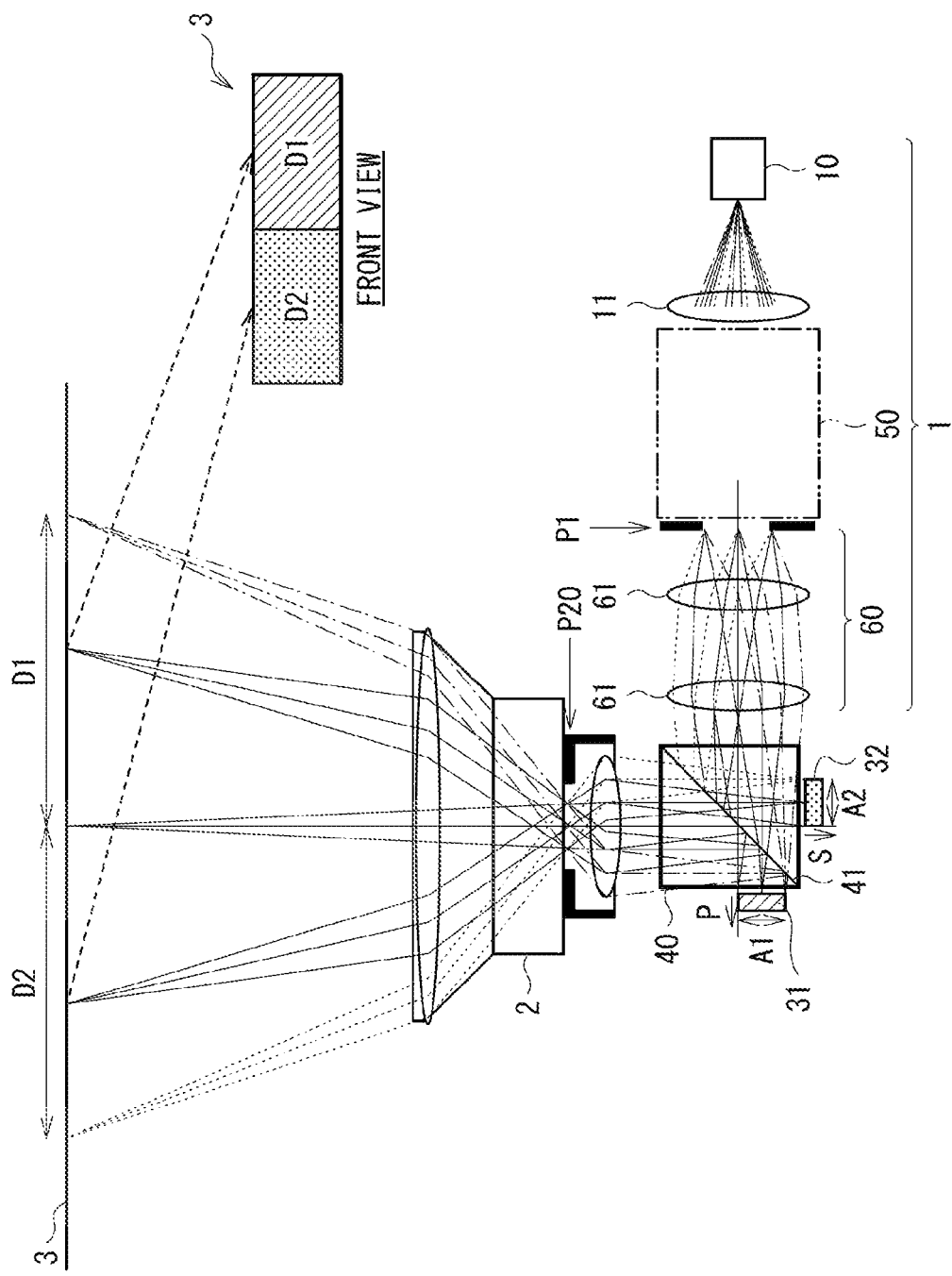
[FIG. 12]

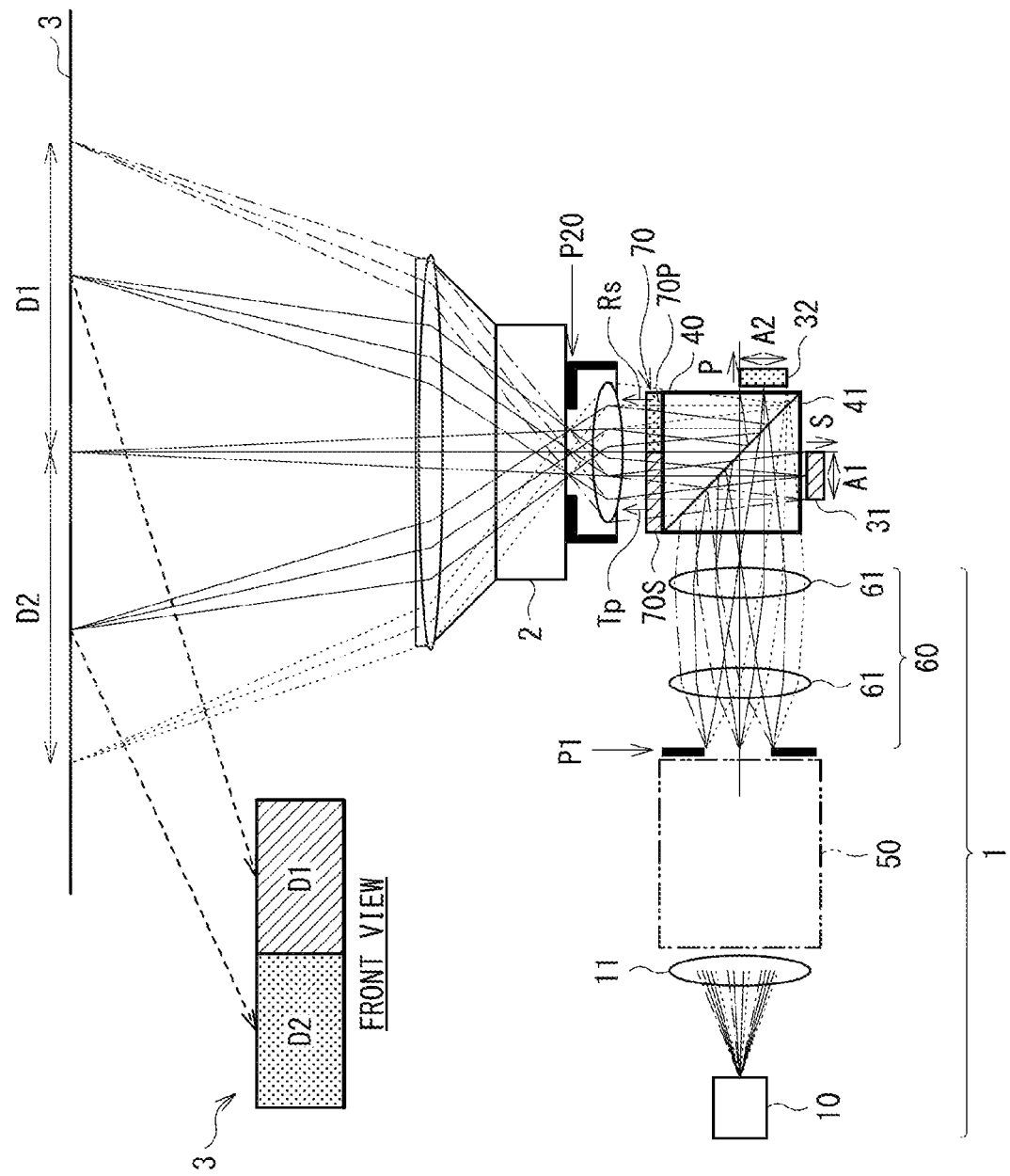
[FIG. 13]

[FIG. 14]
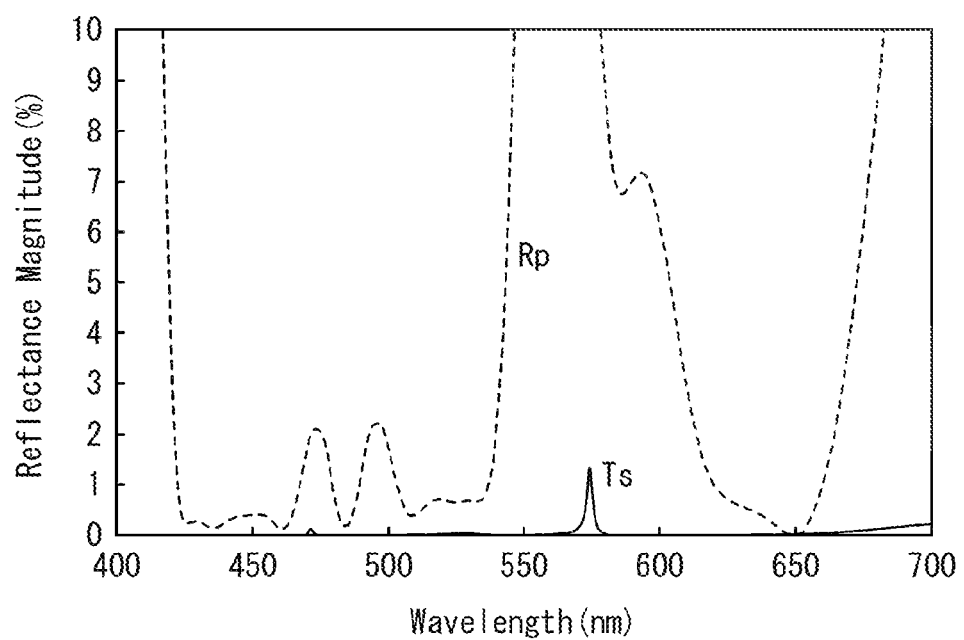

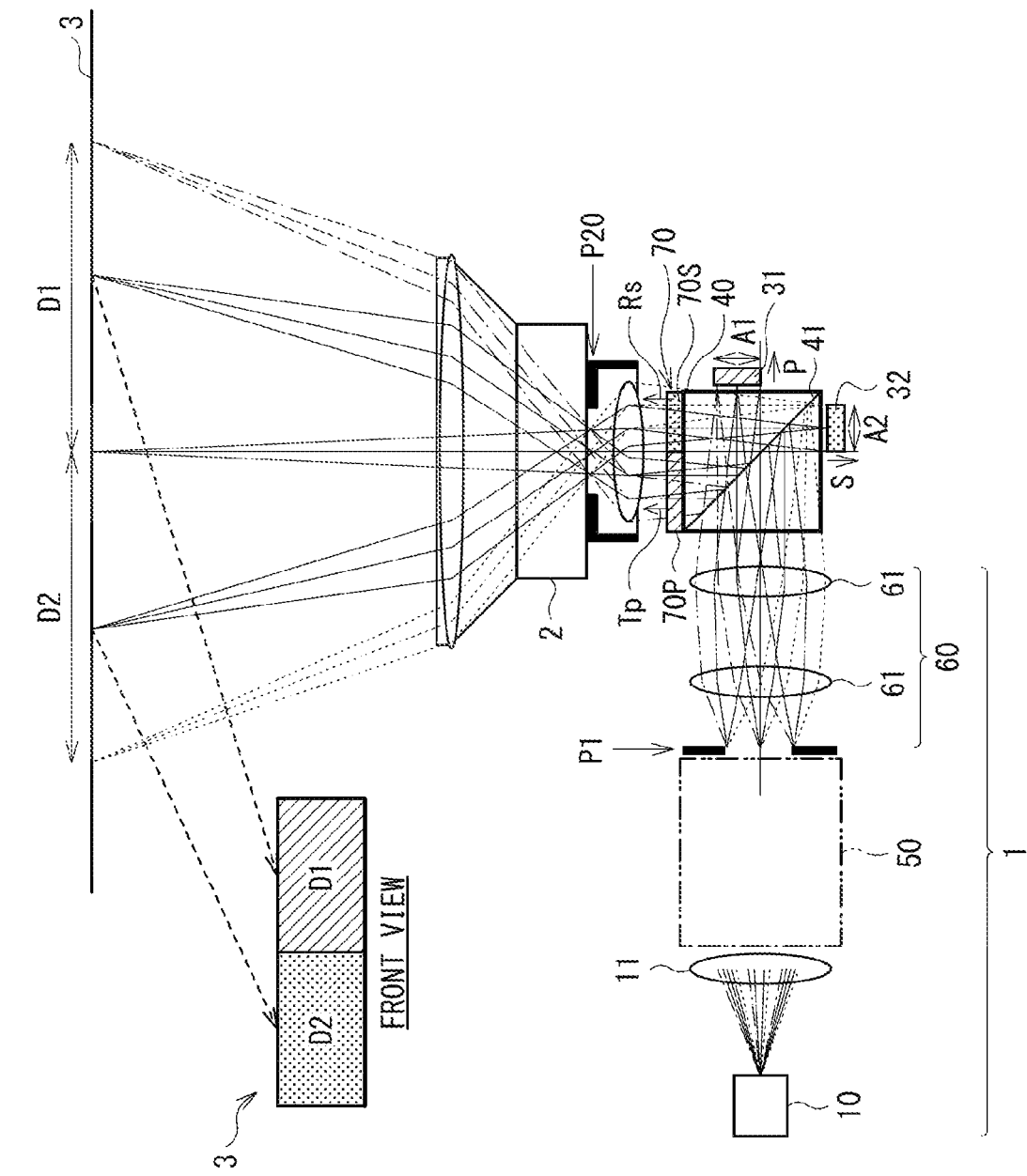
[FIG. 15]

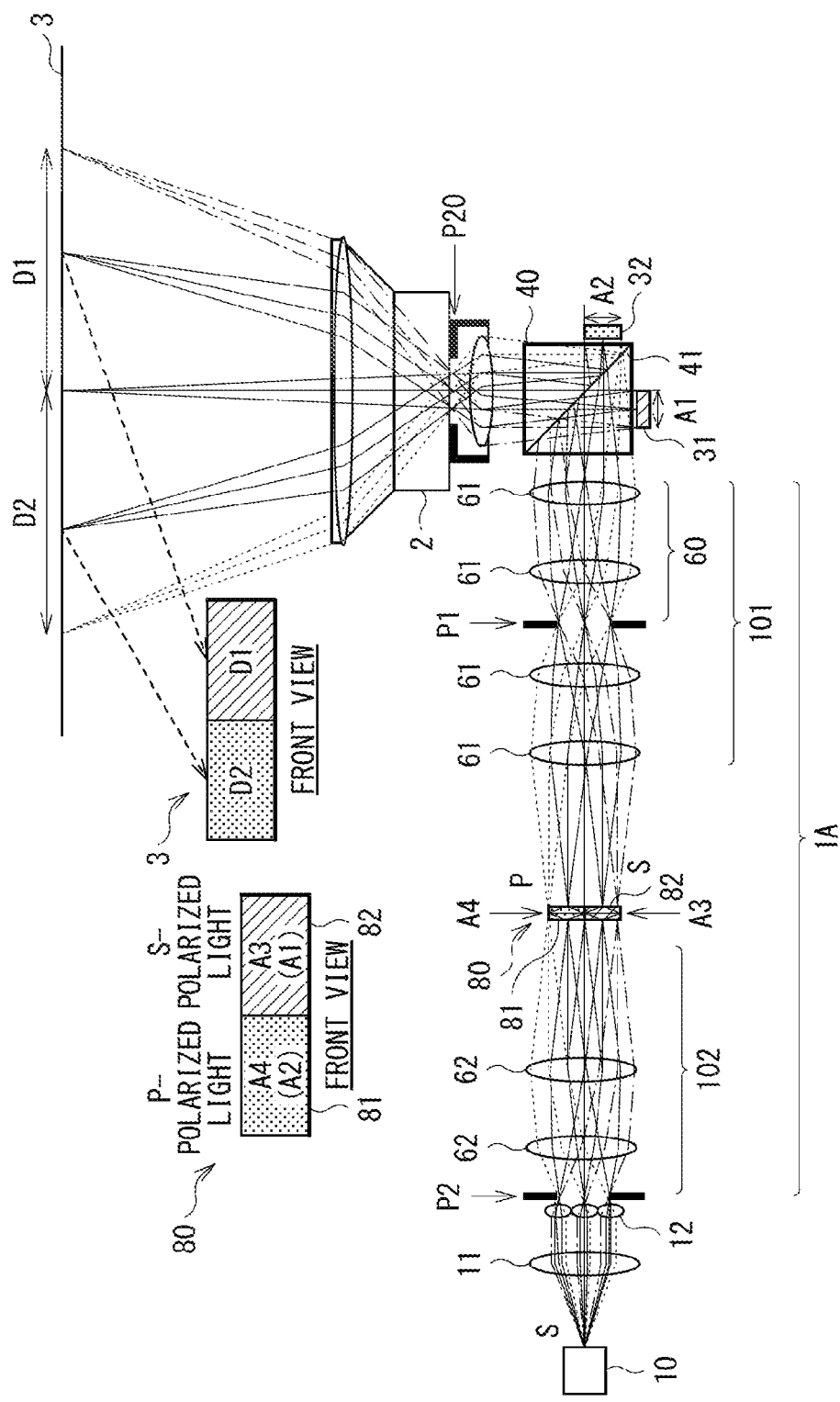
[FIG. 16]

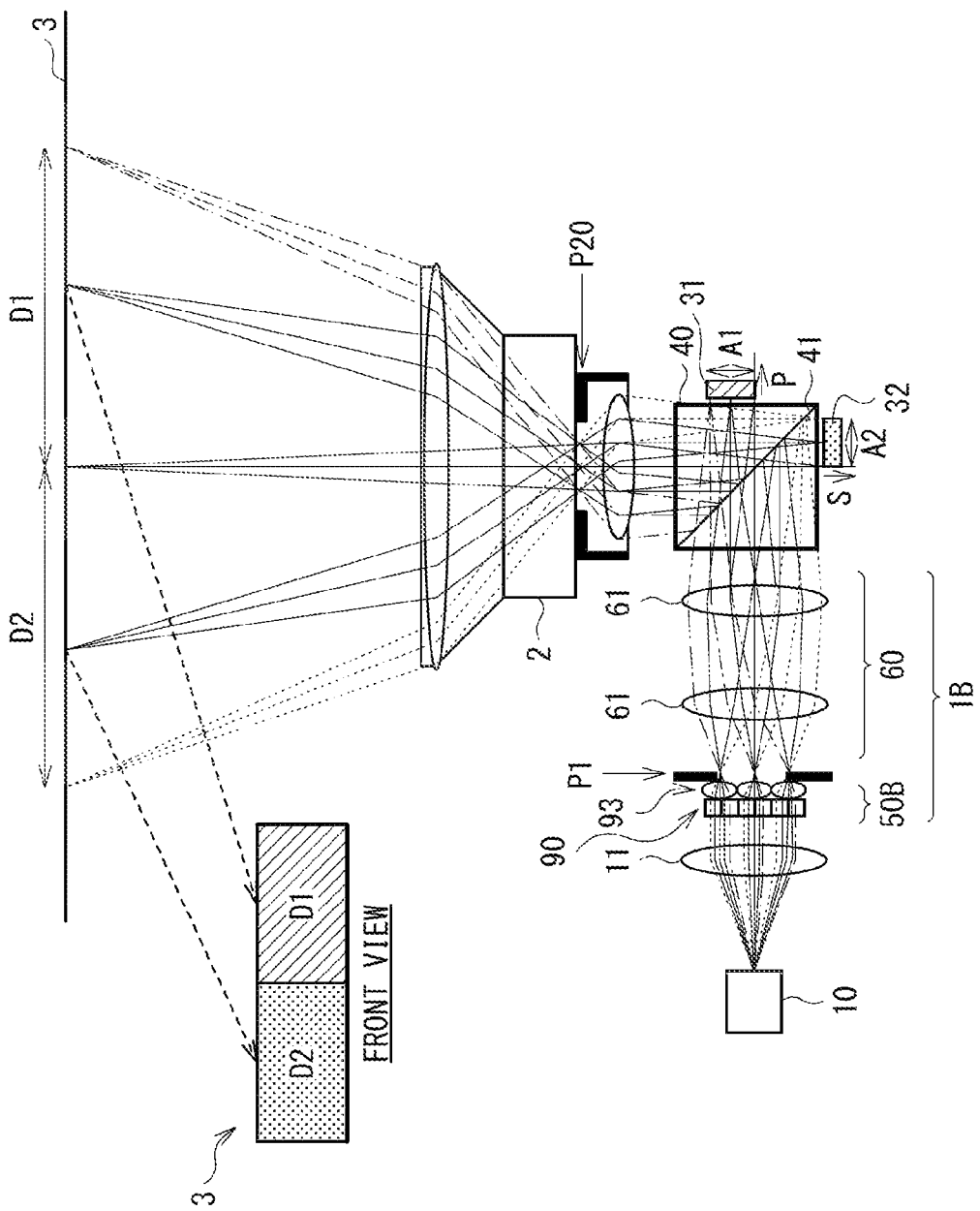

[FIG. 18]
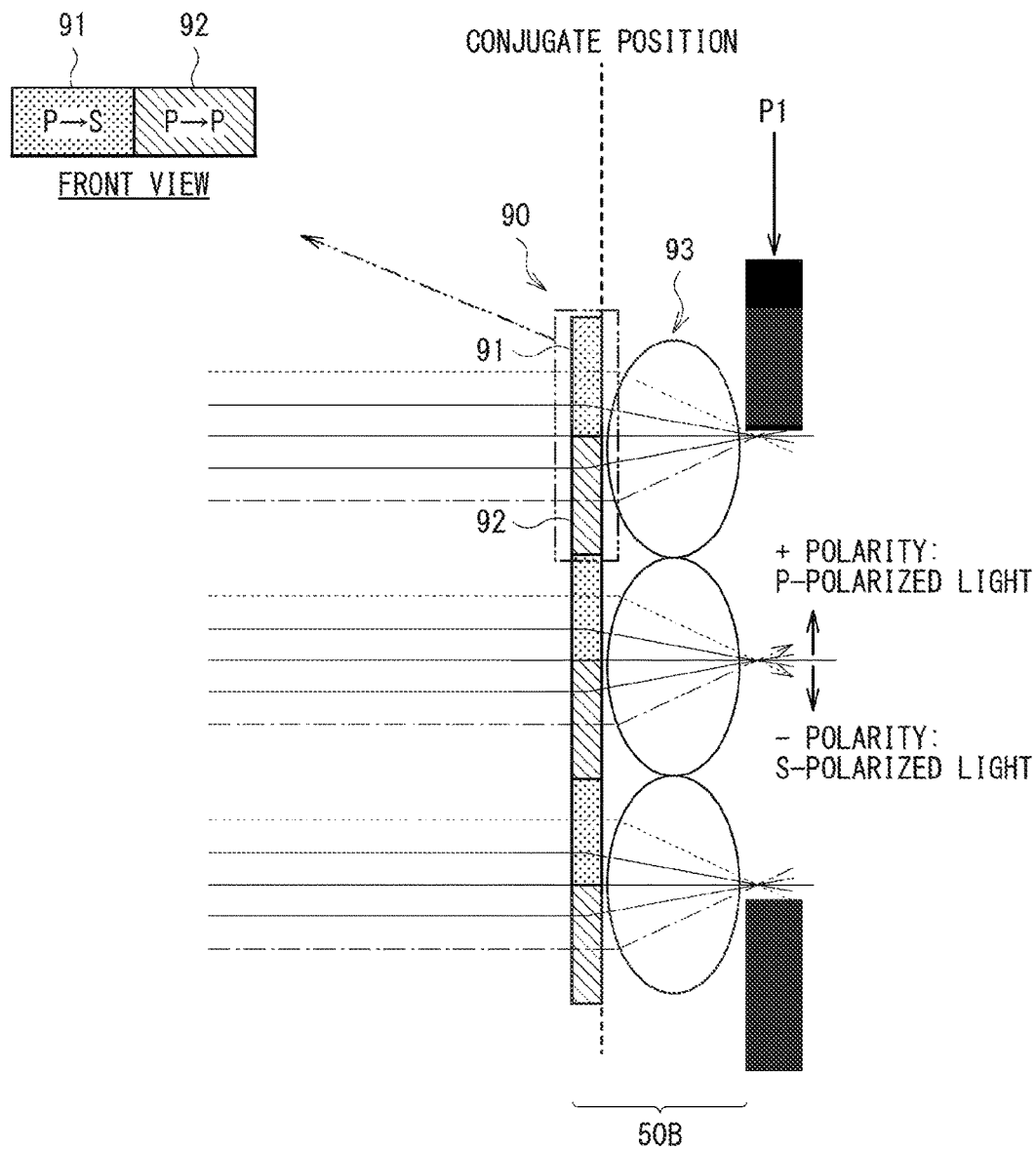

[FIG. 19]
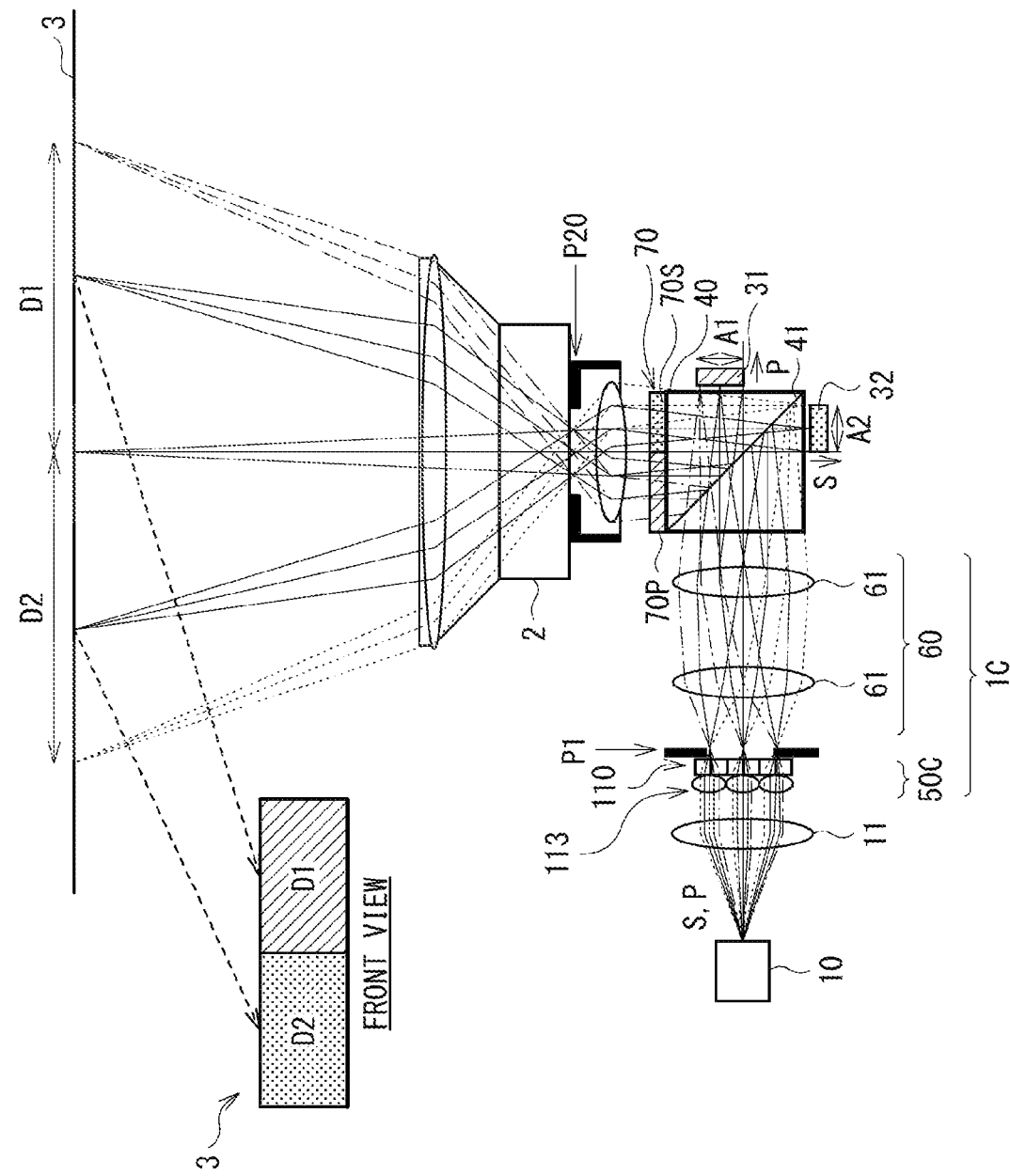

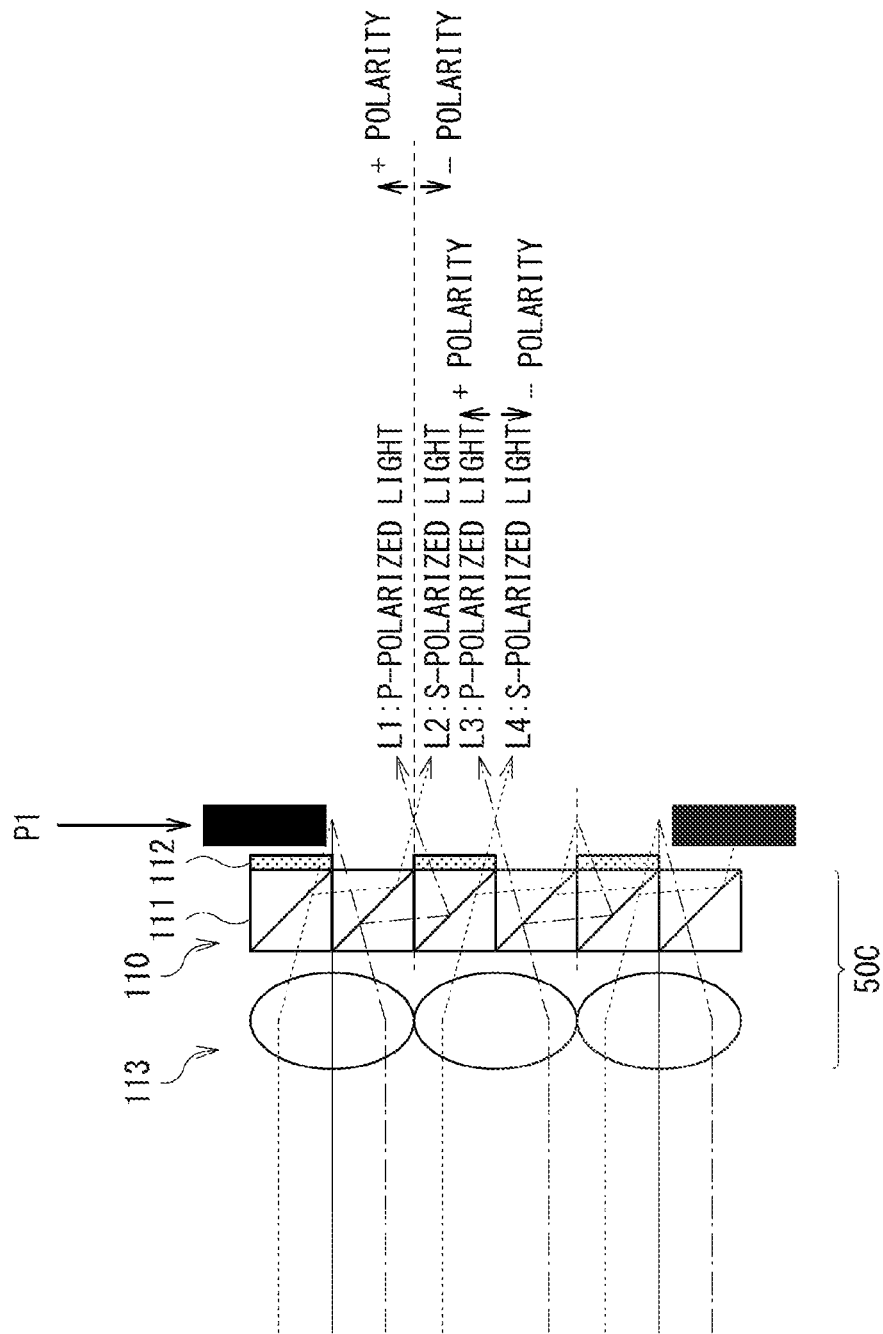
[FIG. 20]

[FIG. 21]
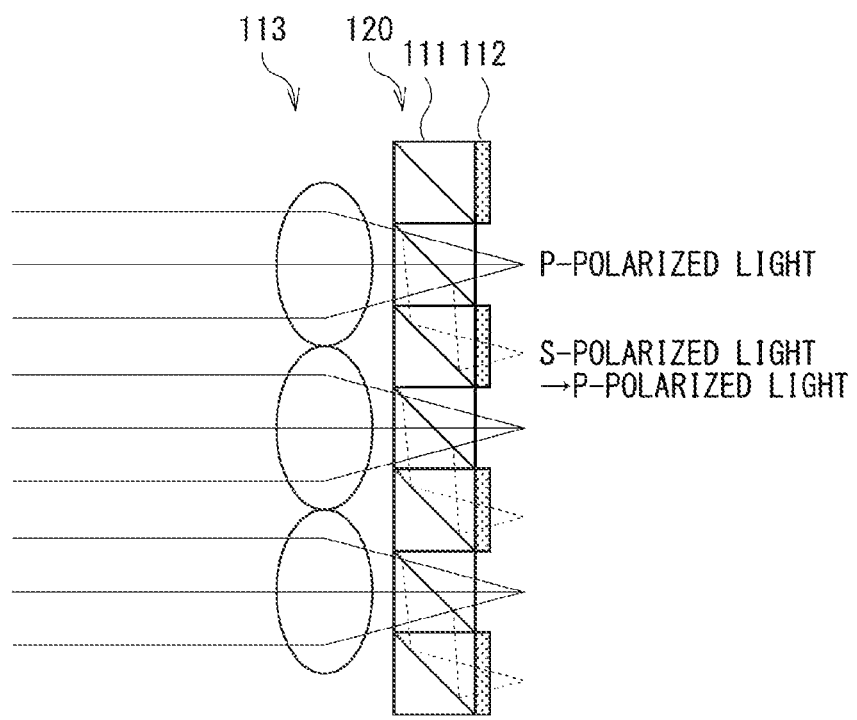

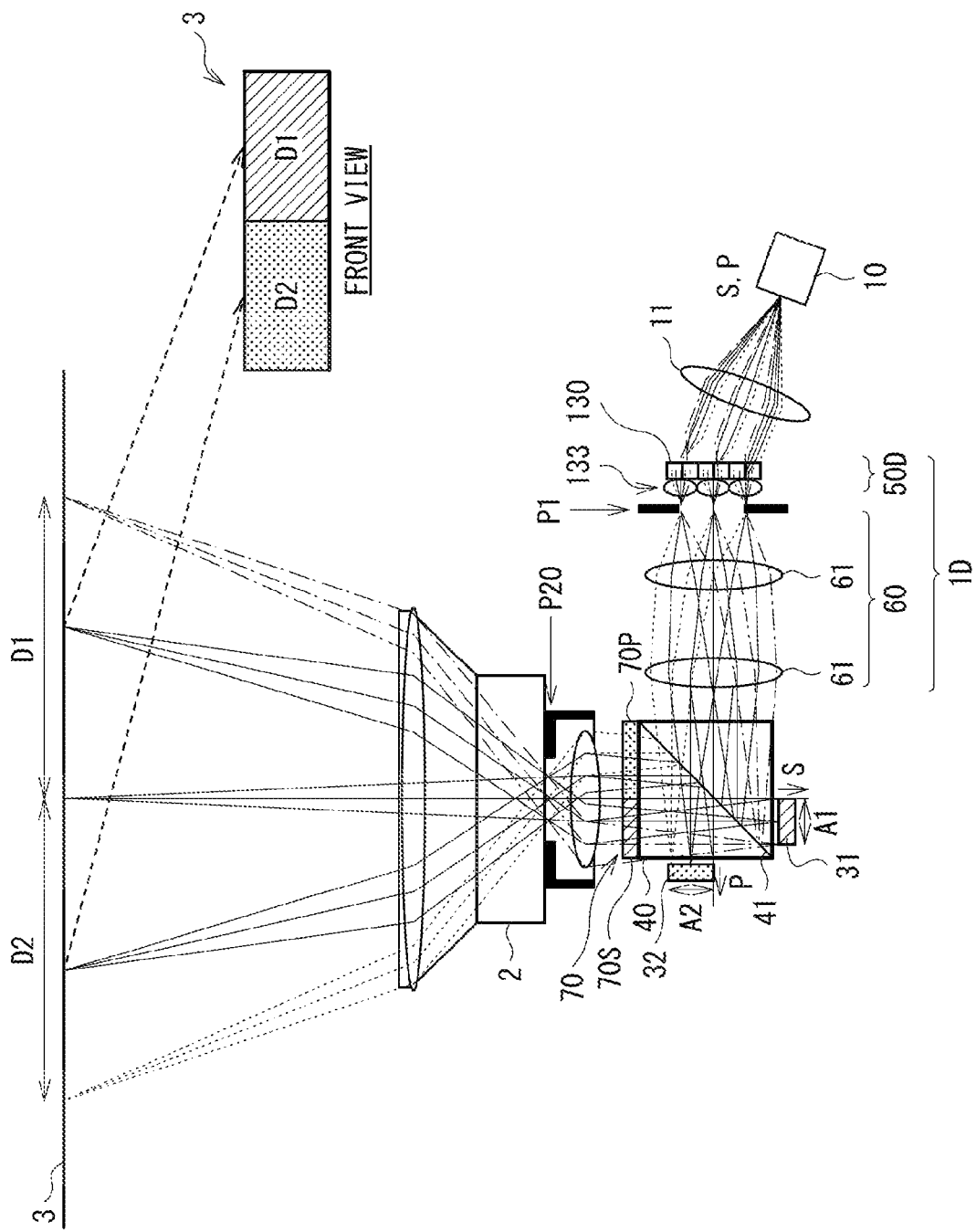

[FIG. 23]
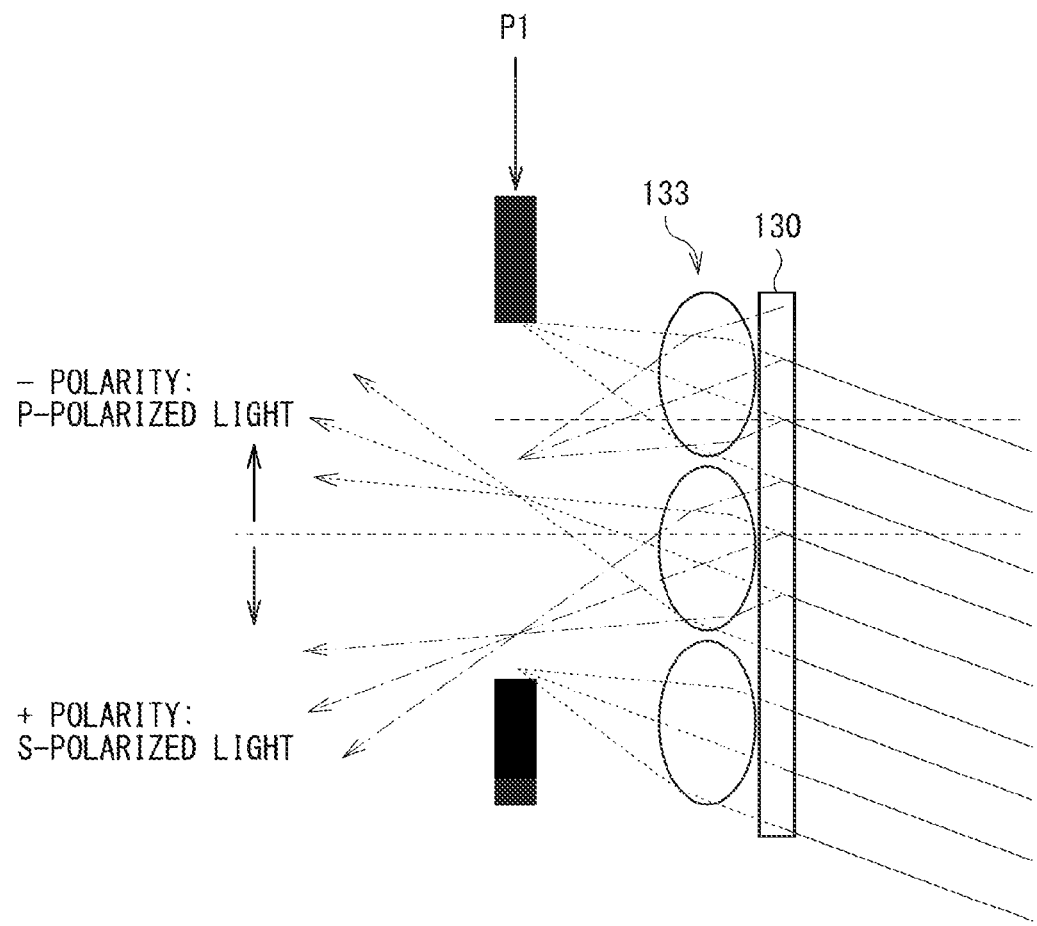

[FIG. 24]
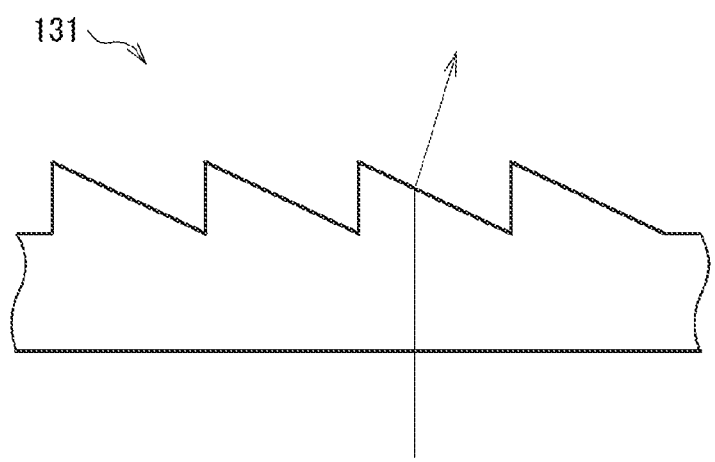
[FIG. 25]
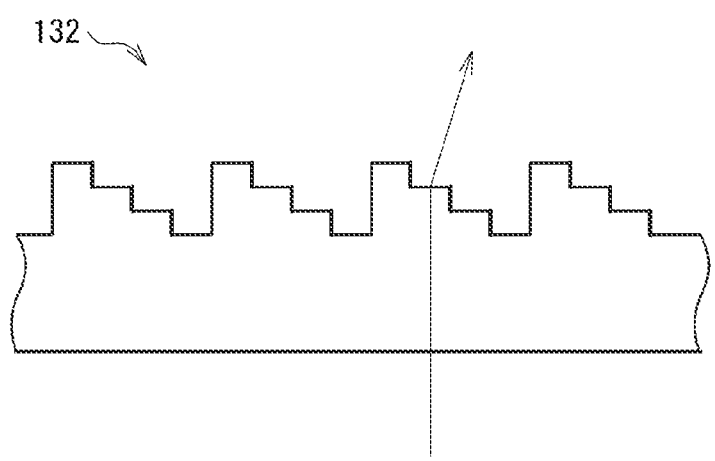

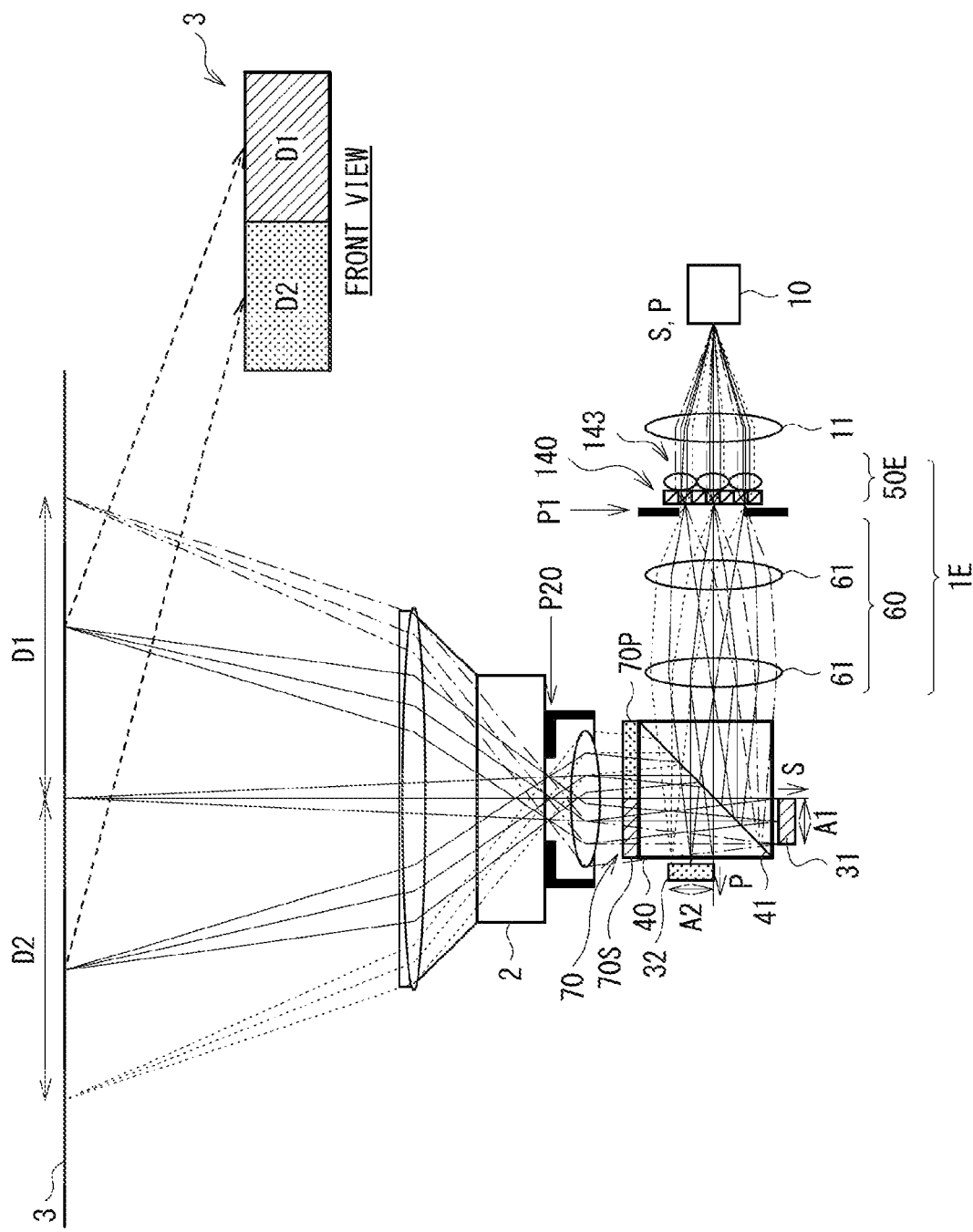

[FIG. 27]
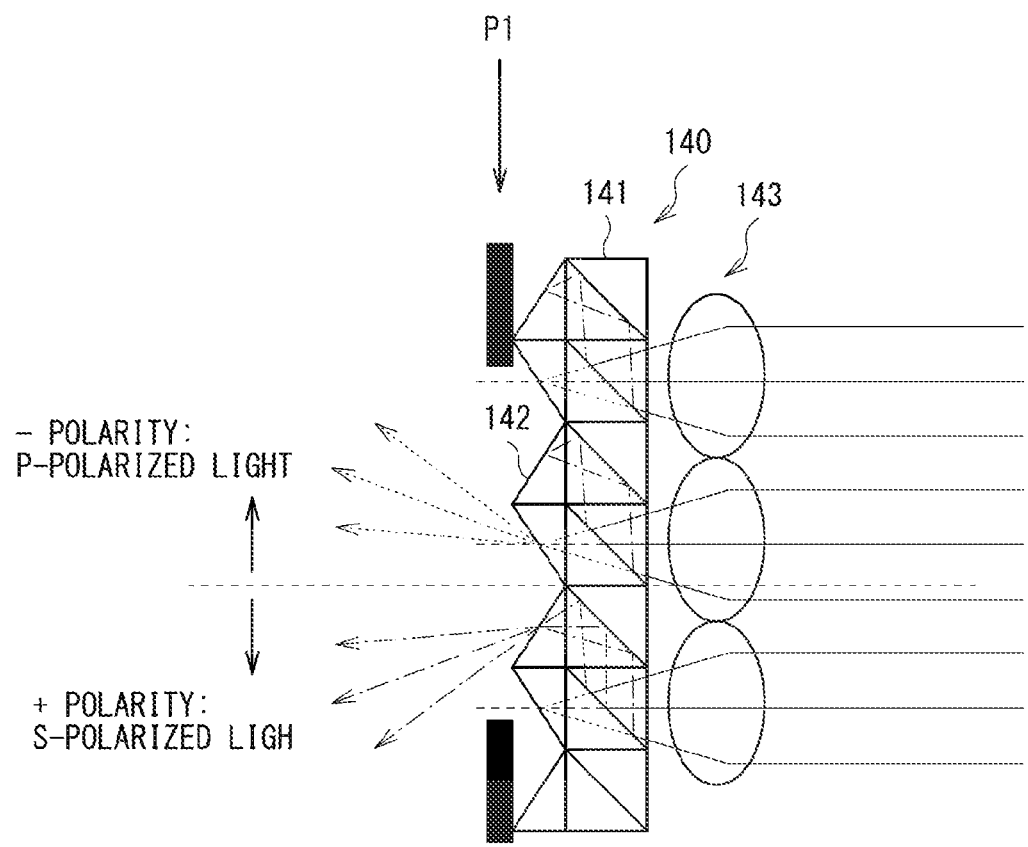

PROJECTOR

CROSS REFERENCE TO RELATED APPLICATIONS

This application is a U.S. National Phase of International Patent Application No. PCT/JP2021/014035 filed on Mar. 31, 2021, which claims priority benefit of Japanese Patent Application No. JP 2020-074073 filed in the Japan Patent Office on Apr. 17, 2020. Each of the above-referenced applications is hereby incorporated herein by reference in its entirety.

TECHNICAL FIELD

The present disclosure relates to a projector.

BACKGROUND ART

It is requested to perform display, for example, in a variety of modes such as making an aspect ratio variable or displaying a plurality of screens with one projector. For example, each of PTLs 1 to 2 proposes to display two screens by using two illumination optical systems and projection optical systems.

CITATION LIST

Patent Literature

PTL 1: Japanese Unexamined Patent Application Publication No. 2017-37104
PTL 2: Japanese Unexamined Patent Application Publication No. 2016-188908

SUMMARY OF THE INVENTION

It is disadvantageous in terms of miniaturization to display two screens by using two illumination optical systems and projection optical systems.

It is desirable to provide a small projector configured to perform display in a variety of modes.

A projector according to an embodiment of the present disclosure includes: an illumination optical system; a separator; a first light valve; a second light valve; and a projection optical system. The illumination optical system generates illumination light. The separator separates the illumination light from the illumination optical system into first illumination light and second illumination light. The first light valve is illuminated with the first illumination light separated by the separator and generates first image light. The second light valve is illuminated with the second illumination light separated by the separator and generates second image light. The first image light generated by the first light valve and the second image light generated by the second light valve enter the projection optical system through the separator. The projection optical system projects the first image light that has entered the projection optical system toward a first display region and projects the second image light that has entered the projection optical system toward a second display region.

The projector according to the embodiment of the present disclosure separates the illumination light from the illumination optical system into the first illumination light and the second illumination light, generates the first image light by using the separated first illumination light, and generates the second image light by using the separated second illumination light. The generated first image light and second image light enter the projection optical system. The first image light is projected toward the first display region and the second image light is projected toward the second display region.

BRIEF DESCRIPTION OF DRAWING

FIG. 1 is a configuration diagram schematically illustrating an example of a projector according to a first embodiment of the present disclosure.
FIG. 2 is a configuration diagram schematically illustrating a first modification example of a display mode by the projector according to the first embodiment.
FIG. 3 is a configuration diagram schematically illustrating a second modification example of the display mode by the projector according to the first embodiment.
FIG. 4 is a configuration diagram schematically illustrating an example of a projector according to a second embodiment.
FIG. 5 is an explanatory diagram for a disposition position of a second light valve in the projector according to the second embodiment.
FIG. 6 is an explanatory diagram for the disposition position of the second light valve in the projector according to the second embodiment.
FIG. 7 is an explanatory diagram illustrating an example of a characteristic of an amount of transmitted light in an optical path 1 illustrated in FIG. 6.
FIG. 8 is an explanatory diagram illustrating an example of a characteristic of an amount of transmitted light in an optical path 2 illustrated in FIG. 6.
FIG. 9 is an explanatory diagram illustrating a first modification example of a shape of PBS in the projector according to the second embodiment.
FIG. 10 is an explanatory diagram illustrating a second modification example of the shape of the PBS in the projector according to the second embodiment.
FIG. 11 is a configuration diagram schematically illustrating an example of a projector according to a third embodiment.
FIG. 12 is a configuration diagram schematically illustrating an example of a projector according to a fourth embodiment.
FIG. 13 is a configuration diagram schematically illustrating an example of a projector according to a fifth embodiment.
FIG. 14 is an explanatory diagram illustrating an example of a characteristic of the PBS in the projector according to the fifth embodiment.
FIG. 15 is a configuration diagram schematically illustrating a modification example of the projector according to the fifth embodiment.
FIG. 16 is a configuration diagram schematically illustrating an example of a projector according to a sixth embodiment.
FIG. 17 is a configuration diagram schematically illustrating an example of a projector according to a seventh embodiment.
FIG. 18 is a configuration diagram schematically illustrating an example of a main portion of an illumination optical system in the projector according to the seventh embodiment.
FIG. 19 is a configuration diagram schematically illustrating an example of a projector according to an eighth embodiment.

FIG. 20 is a configuration diagram schematically illustrating an example of a main portion of an illumination optical system in the projector according to the eighth embodiment.

FIG. 21 is a configuration diagram schematically illustrating an example of a polarization conversion element serving as a comparative example for a PBS array in the projector according to the eighth embodiment.

FIG. 22 is a configuration diagram schematically illustrating an example of a projector according to a ninth embodiment.

FIG. 23 is a configuration diagram schematically illustrating an example of a main portion of an illumination optical system in the projector according to the ninth embodiment.

FIG. 24 is a configuration diagram schematically illustrating a first example of a polarization selectivity element in the projector according to the ninth embodiment.

FIG. 25 is a configuration diagram schematically illustrating a second example of the polarization selectivity element in the projector according to the ninth embodiment.

FIG. 26 is a configuration diagram schematically illustrating an example of a projector according to a tenth embodiment.

FIG. 27 is a configuration diagram schematically illustrating an example of a main portion of an illumination optical system in the projector according to the tenth embodiment.

MODES FOR CARRYING OUT THE INVENTION

The following describes embodiments of the present disclosure in detail with reference to the drawings. It is to be noted that description is given in the following order.

0. Comparative Example
1. First Embodiment (FIGS. 1 to 3)
 1.1 Configuration and Operation of Projector according to First Embodiment
 1.2 Effects
 1.3 Modification Examples
2. Second Embodiment (FIGS. 4 to 10)
3. Third Embodiment (FIG. 11)
4. Fourth Embodiment (FIG. 12)
5. Fifth Embodiment (FIGS. 13 to 15)
6. Sixth Embodiment (FIG. 16)
7. Seventh Embodiment (FIGS. 17 to 18)
8. Eighth Embodiment (FIGS. 19 to 21)
9. Ninth Embodiment (FIGS. 22 to 25)
10. Tenth Embodiment (FIGS. 26 to 27)
11. Other Embodiments 0. Comparative Example (Overview and Problem with Projector according to Comparative Example)

PTL 1 proposes a projector including two illumination optical systems and two projection optical systems. In the projector described in PTL 1, two pieces of image light generated by a single display element are projected by the two projection optical systems to achieve two-screen display. The projector described in PTL 1 includes two illumination optical systems and two projection optical systems, leading to a larger configuration. In addition, in a case where the display region of a single display element is divided to generate two pieces of image light, the resolution is halved as compared with a case where a single screen is displayed as a whole.

PTL 2 proposes a projector including two illumination optical systems, two light modulation sections, a synthesis optical section that synthesizes two pieces of modulated light generated by the two light modulation sections, and one projection optical system. The projector described in PTL 2 is configured to switch a state of projecting two pieces of modulated light side by side and a state of projecting two pieces of superimposed modulated light by switching the disposition states of the synthesis optical section. The projector described in PTL 2 includes two illumination optical systems, leading to a larger configuration. In addition, a mechanism is not feasible that switches the disposition states of the synthesis optical section.

It is therefore desired to develop a projector configured to perform display in a variety of modes such as displaying two screens without increasing a configuration in size.

1. First Embodiment

[1.1 Configuration and Operation of Projector according to First Embodiment]
(Configuration)
FIG. 1 schematically illustrates a configuration example of a projector according to a first embodiment of the present disclosure.

The projector according to the first embodiment includes an illumination optical system 1, a projection optical system 2, a light source 10, and a condenser lens 11. In addition, the projector according to the first embodiment includes a first light valve 31, a second light valve 32, and PBS (polarizing beam splitter) 40 serving as a polarization separator.

The illumination optical system 1 includes a front optical system 50 disposed to precede a first illumination system pupil P1 (light source 10 side) and a rear optical system 60 disposed to follow the first illumination system pupil P1 (PBS 40 side). The rear optical system 60 includes a plurality of condenser lenses 61.

It is to be noted that FIG. 1 simplifies and illustrates a configuration of the illumination optical system 1. Specifically, it is possible to apply, for example, illumination optical systems 1A, 1B, 1C, 1D, and 1E described in sixth to tenth embodiments described below as the illumination optical system 1. It is possible to apply any of the configurations of front optical systems 50B, 50C, 50D, and 50E in the illumination optical systems 1B, 1C, 1D, and 1E described in the seventh to tenth embodiments described below to the front optical system 50.

The light source 10 is a laser light source that emits, for example, linearly-polarized light. In addition, the light source 10 may be LED (Light Emitting Diode) or a phosphor light source that emits randomly-polarized light.

The condenser lens 11 converts light from the light source 10 into substantially parallel light and emits the light to the illumination optical system 1.

The illumination optical system 1 generates illumination light and emits the illumination light toward the PBS 40. The illumination light includes a first polarized component (e.g., an S-polarized component or a P-polarized component with respect to the PBS 40) and a second polarized component (e.g., a P-polarized component or an S-polarized component with respect to the PBS 40).

The PBS 40 includes a polarization separation layer 41. The PBS 40 causes the polarization separation layer 41 to separate the illumination light from the illumination optical system 1 into first illumination light and second illumination light in accordance with a difference between the polarization directions. The PBS 40 emits the first illumination light toward the first light valve 31 and emits the second illumination light toward the second light valve 32. In addition, the PBS 40 emits first image light and second image light toward the projection optical system 2. The first image light is generated by the first light valve. The second image light is generated by the second light valve 32.

The first light valve 31 is disposed in a first illumination region A1 that is illuminated with the first illumination light. The second light valve 32 is disposed in a second illumination region A2 that is illuminated with the second illumination light.

The first light valve 31 and the second light valve 32 each include a plurality of pixels. The first light valve 31 and the second light valve 32 are, for example, reflective spatial light modulation liquid crystal display elements. The first light valve 31 and the second light valve 32 each modulate light for each of the pixels on the basis of an image signal.

The projection optical system 2 includes, for example, a plurality of lenses. The projection optical system 2 includes an exit pupil P20 that is conjugate with the first illumination system pupil P1 of the illumination optical system 1. The projection optical system 2 projects the first image light coming through the PBS 40 toward a first display region D1 on a projection surface such as a screen 3 and projects the second image light coming through the PBS 40 toward a second display region D2 on the projection surface such as the screen 3.

(Operation)

The substantially parallel light from the light source 10 enters the illumination optical system 1 through the condenser lens 11. The illumination optical system 1 generates illumination light and emits the illumination light toward the PBS 40. The illumination light includes the first polarized component serving, for example, as S-polarized light with respect to the PBS 40 and a second polarized component serving, for example, as P-polarized light with respect to the PBS 40.

The PBS 40 causes the polarization separation layer 41 to separate the illumination light from the illumination optical system 1 into the first illumination light (e.g., S-polarized light) and the second illumination light (e.g., P-polarized light) in accordance with a difference between the polarization directions. Here, the polarization separation layer 41 of the PBS 40 has characteristics of reflecting the S-polarized light and transmitting the P-polarized light. The S-polarized light therefore enters the first light valve 31 and the P-polarized light enters the second light valve 32.

The first light valve 31 and the second light valve 32 each control the polarization state of incident light for each of the pixels on the basis of an image signal. For example, in a case where display is performed in a certain pixel as an image signal at a luminance gradation of 70% of the amount of incident light, 70% of the incident light is emitted from the first light valve 31 as P-polarized light and emitted from the second light valve 32 as S-polarized light. The P-polarized light from the first light valve 31 and the S-polarized light from the second light valve 32 are synthesized by the PBS 40 and projected through the projection optical system 2 on the first display region D1 and the second display region D2. Meanwhile, the other 30% of the incident light is emitted from the first light valve 31 as S-polarized light and emitted from the second light valve 32 as P-polarized light. The S-polarized light from the first light valve 31 and the P-polarized light from the second light valve 32 are synthe-sized by the PBS 40 and return to the illumination optical system 1. In a case of a luminance gradation of 0%, all the amount of light return to the illumination optical system 1.

This displays two screens each having a desired luminance gradation on the projection surface such as the screen 3. It is to be noted that these two screens may form one screen as a whole or independent images may be displayed on the two screens.

(Modification Examples of Display Mode)

FIG. 2 schematically illustrates a first modification example of a display mode by the projector according to the first embodiment. FIG. 3 schematically illustrates a second modification example of the display mode by the projector according to the first embodiment.

The projector according to the first embodiment may further include a drive mechanism 33 that allows the disposition position of at least one of the first light valve 31 or the second light valve 32 to move.

Each of FIGS. 2 and 3 illustrates an example in which the drive mechanism 33 allows the first light valve 31 to move in the horizontal direction.

Display (two independent screens are displayed) may be hereby performed in which the first display region D1 goes apart from the second display region D2, for example, as illustrated in FIG. 2.

In addition, display may be performed in which the first display region D1 is partially superimposed on the second display region D2, for example, as illustrated in FIG. 3. This makes it possible to perform display in which, for example, in a case where the first display region D1 and the second display region D2 form one screen as a whole, the aspect ratio of the whole screen is varied. In addition, two independent screens having aspect ratios different from each other may be displayed.

[1.2 Effects]

As described above, the projector according to the first embodiment separates the illumination light generated by the one illumination optical system into the first illumination light and the second illumination light, generates the first image light and the second image light on the basis of the separated first illumination light and second illumination light, and projects the generated first image light and second image light onto the first display region D1 and the second display region D2 by using the one projection optical system 2. This makes it possible to perform display in a variety of modes at a small size.

In addition, the projector according to the first embodiment uses two light valves (the first light valve 31 and the second light valve 32) to generate the first image light and the second image light. This makes it possible to display two screens without reducing the resolution.

It is to be noted that the effects described in this specification are merely illustrative, but not limitative. In addition, there may be any other effects. The same applies to the effects of the following other embodiments.

[1.3 Modification Examples]

In the description above, a configuration has been described as an example in which the projector includes the polarization separator (PBS 40) as a separator that separates the illumination light from the illumination optical system 1 into the first illumination light and the second illumination light and the illumination light is separated into the first illumination light and the second illumination light in accordance with a difference between the polarization directions. A configuration may be, however, adopted in which colors are separated on the basis of wavelengths. In this case, the projector may include a color separator in place of the polarization separator. The first light valve 31 and the second light valve 32 may be then illuminated with pieces of illumination light having wavelengths different from each other. The first light valve 31 and the second light valve 32 may then emit the first image light and the second image light having wavelengths different from each other, respectively. Images having wavelengths different from each other may be displayed in the first display region D1 and the second display region D2. The same applies to the following other embodiments.

In addition, FIG. 1 illustrates the example of the cube-type PBS 40 as the polarization separator, but plate-type PBS may be used as the polarization separator.

In addition, in the description above, the case has been described as an example where the first light valve 31 and the second light valve 32 are liquid crystal display elements. The first light valve 31 and the second light valve 32 may be, however, digital mirror devices, for example. The same applies to the following other embodiments.

2. Second Embodiment

Next, a projector according to a second embodiment of the present disclosure is described. It is to be noted that the following denotes a component which is substantially the same as that of the projector according to the first embodiment described above with the same sign and omits description as appropriate.

FIG. 4 schematically illustrates a configuration example of the projector according to the second embodiment.

The first light valve 31 and the second light valve 32 of the projector according to the second embodiment have disposition positions different from those of the projector according to the first embodiment.

The illumination optical system 1 of the projector according to the second embodiment emits a P-polarized component to the PBS 40 as the first polarized component. In addition, the illumination optical system 1 emits an S-polarized component to the PBS 40 as the second polarized component. The first light valve 31 is disposed at a position at which the P-polarized component passing through the polarization separation layer 41 of the PBS 40 is incident. The second light valve 32 is disposed at a position at which the S-polarized component reflected by the polarization separation layer 41 of the PBS 40 is incident.

The PBS 40 of the projector according to the second embodiment causes the polarization separation layer 41 to separate the illumination light from the illumination optical system 1 into P-polarized light serving as the first illumination light and S-polarized light serving as the second illumination light in accordance with a difference between the polarization directions. Here, the polarization separation layer 41 of the PBS 40 has characteristics of reflecting the S-polarized light and transmitting the P-polarized light. The P-polarized light therefore enters the first light valve 31 and the S-polarized light enters the second light valve 32.

The first light valve 31 and the second light valve 32 each control the polarization state of incident light for each of the pixels on the basis of an image signal. For example, in a case where display is performed in a certain pixel as an image signal at a luminance gradation of 70% of the amount of incident light, 70% of the incident light is emitted from the first light valve 31 as S-polarized light and emitted from the second light valve 32 as P-polarized light. The S-polarized light from the first light valve 31 and the P-polarized light from the second light valve 32 are synthesized by the PBS 40 and projected through the projection optical system 2 on the first display region D1 and the second display region D2. Meanwhile, the other 30% of the incident light is emitted from the first light valve 31 as P-polarized light and emitted from the second light valve 32 as S-polarized light. The P-polarized light from the first light valve 31 and the S-polarized light from the second light valve 32 are synthesized by the PBS 40 and return to the illumination optical system 1. In a case of a luminance gradation of 0%, all the amount of light return to the illumination optical system 1.

This displays two screens each having a desired luminance gradation on the projection surface such as the screen 3. It is to be noted that these two screens may form one screen as a whole or independent images may be displayed on the two screens.

(Details of Disposition Position of Second Light Valve 32)

FIG. 5 is an explanatory diagram for the disposition position of the second light valve 32 in the projector according to the second embodiment.

As described above, in the projector according to the second embodiment, the second image light generated by the second light valve 32 is configured as image light that passes through the polarization separation layer 41 of the PBS 40 toward the projection optical system 2. It is desirable that the second light valve 32 configured to have this image light passing through the polarization separation layer 41 toward the projection optical system 2 be disposed on the sharp angle side in one triangular prism 42 included in the PBS 40 (closer to the sharp angle side than a central position C1 of the triangular prism 42) as illustrated in FIG. 5. If described in more detail, it is desirable to dispose the second light valve 32 at a position that satisfies a conditional expression (1) described below. As described below, this makes it possible to increase the contrast and reduce the in-plane unevenness in a case of black display.

In other words, it is desirable that the following conditional expression (1) be satisfied in a case where L represents the distance from the incidence surface to the emission surface of the PBS 40 for the image light passing through the polarization separation layer 41 and d represents the distance from the incidence surface of the PBS 40 for the image light passing through the polarization separation layer 41 to the polarization separation layer 41.

$$d \leq L/2 \tag{1}$$

It is to be noted that the distance L is also the total length of transmission in the PBS 40 on a straight line vertical extending from the center of the pixel region of the second light valve 32. In addition, the distance d is also the distance from the second light valve 32 side to the polarization separation layer 41 in the PBS 40 on the straight line.

The second light valve 32 has disposition that satisfies the conditional expression (1). This offers an effect as follows. In a case where a black screen is displayed, the second light valve 32 configured to cause the generated image light to pass through the polarization separation layer 41 toward the projection optical system 2 emits S-polarized light as image light. However, the PBS 40 usually has refractive index anisotropy for temperature, external force, or the like. Polarization disturbance thus occurs while light is passing through the PBS 40, resulting in a mixture of S-polarized light and P-polarized light. This causes the PBS 40 to emit a larger amount of light. As a result, the contrast of an image is deteriorated and a black screen has unevenness in a case where the screen is displayed.

The amount of polarization disturbance is determined by the photoelastic characteristics of a material of the PBS 40 and the length of an optical path through which a light ray passes. It is thus desirable that the length (the distance d defined above) of the optical path in the PBS 40 prior to polarization rectification be short. The disposition that satisfies the conditional expression (1) increases the contrast and suppresses the in-plane unevenness in a case of black display. In addition, such a configuration is more effective to shorten the backfocus of the projection optical system 2 in a case where an inexpensive material having a high refractive index is selected as the PBS 40.

FIG. 6 illustrates an example of the disposition position of the second light valve 32 in the projector according to the second embodiment. FIG. 7 illustrates an example of the characteristics of the amount of transmitted light in an optical path 1 illustrated in FIG. 6. FIG. 8 illustrates an example of the characteristics of the amount of transmitted light in an optical path 2 illustrated in FIG. 6.

In FIG. 6, the optical path 1 indicates an optical path of light from the second light valve 32 in a case where the second light valve 32 has disposition that does not satisfy the conditional expression (1). The optical path 2 indicates an optical path of light from the second light valve 32 in a case where the second light valve 32 has disposition that satisfies the conditional expression (1).

As described above, the PBS 40 usually has refractive index anisotropy for temperature, external force, or the like. Polarization disturbance thus occurs while light is passing through the PBS 40, resulting in a mixture of S-polarized light and P-polarized light. The amount of light emitted from the PBS 40 (the amount of transmitted light) therefore increases in the optical path 1 as the temperature increases and returns to the original (reversibility) as the temperature decreases as illustrated in FIG. 7. In contrast, as illustrated in FIG. 8, the optical path 2 has almost no change in the amount of emitted light (the amount of transmitted light) brought about by temperature.

FIG. 9 illustrates a first modification example of the shape of the PBS 40 in the projector according to the second embodiment. FIG. 10 illustrates a second modification example of the shape of the PBS 40 in the projector according to the second embodiment.

The case has been described above where the PBS 40 has a substantially square cross section. However, it is also desirable that PBS 40A and PBS 40B each having a rectangular shape in which the length of the cross section in the horizontal direction and the length thereof in the vertical direction are different as illustrated in FIGS. 9 and 10 each satisfy the conditional expression (1). In this case, a principle similar to the principle described above holds.

It is to be noted that it is desirable that the disposition position of the first light valve 31 satisfy the conditional expression (1) described above in a case where the first image light generated by the first light valve 31 is configured as image light that passes through the polarization separation layer 41 of the PBS 40 toward the projection optical system 2 as in a third embodiment described below. In this case, a similar principle holds in a case where the second light valve 32 in the description above is replaced with the first light valve 31.

Other components, operations, and effects may be substantially similar to those of the projector according to the first embodiment described above.

3. Third Embodiment

Next, the projector according to the third embodiment of the present disclosure is described. It is to be noted that the following denotes a component which is substantially the same as that of the projector according to the first or second embodiment described above with the same sign and omits description as appropriate.

FIG. 11 schematically illustrates a configuration example of the projector according to the third embodiment.

The disposition position of the whole illumination optical system 1 with respect to the PBS 40 and the disposition positions of the first light valve 31 and the second light valve 32 in the projector according to the third embodiment are different from those of the projector according to the first embodiment described above.

The projector according to the third embodiment has a configuration in which the disposition of the whole illumination optical system 1 with respect to the PBS 40 is flipped horizontally from that of the projector according to the first embodiment described above.

The illumination optical system 1 of the projector according to the third embodiment emits an S-polarized component to the PBS 40 as the first polarized component as with the projector according to the first embodiment described above. In addition, the illumination optical system 1 emits a P-polarized component to the PBS 40 as the second polarized component. The first light valve 31 is disposed at a position at which the S-polarized component reflected by the polarization separation layer 41 of the PBS 40 is incident. The second light valve 32 is disposed at a position at which the P-polarized component passing through the polarization separation layer 41 of the PBS 40 is incident.

The PBS 40 of the projector according to the third embodiment causes the polarization separation layer 41 to separate the illumination light from the illumination optical system 1 into S-polarized light serving as the first illumination light and P-polarized light serving as the second illumination light in accordance with a difference between the polarization directions. Here, the polarization separation layer 41 of the PBS 40 has characteristics of reflecting the S-polarized light and transmitting the P-polarized light. The S-polarized light therefore enters the first light valve 31 and the P-polarized light enters the second light valve 32.

In the projector according to the third embodiment, the first image light generated by the first light valve 31 is configured as image light that passes through the polarization separation layer 41 of the PBS 40 toward the projection optical system 2. It is desirable that the first light valve 31 configured to have this image light passing through the polarization separation layer 41 toward the projection optical system 2 be disposed on the sharp angle side in one triangular prism 42 included in the PBS 40 (closer to the sharp angle side than a central position C1 of the triangular prism 42) as with the case of the second light valve 32 illustrated in FIG. 5. If described in more detail, it is desirable to dispose the first light valve 31 at a position that satisfies a conditional expression (1) described above. This makes it possible to increase the contrast and reduce the in-plane unevenness in a case of black display as with the projector according to the second embodiment described above.

Other components, operations, and effects may be substantially similar to those of the projector according to the first or second embodiment described above.

4. Fourth Embodiment

Next, a projector according to a fourth embodiment of the present disclosure is described. It is to be noted that the following denotes a component which is substantially the same as that of the projector according to any of the first to third embodiments described above with the same sign and omits description as appropriate.

FIG. 12 schematically illustrates a configuration example of the projector according to the fourth embodiment.

The disposition position of the whole illumination optical system 1 with respect to the PBS 40 and the disposition positions of the first light valve 31 and the second light valve 32 in the projector according to the fourth embodiment are different from those of the projector according to the first embodiment described above.

The projector according to the fourth embodiment has a configuration in which the disposition of the whole illumination optical system 1 with respect to the PBS 40 is flipped horizontally from that of the projector according to the first embodiment described above.

The illumination optical system 1 of the projector according to the fourth embodiment emits a P-polarized component to the PBS 40 as the first polarized component as with the projector according to the second embodiment described above. In addition, the illumination optical system 1 emits an S-polarized component to the PBS 40 as the second polarized component. The first light valve 31 is disposed at a position at which the P-polarized component passing through the polarization separation layer 41 of the PBS 40 is incident. The second light valve 32 is disposed at a position at which the S-polarized component reflected by the polarization separation layer 41 of the PBS 40 is incident.

The PBS 40 of the projector according to the fourth embodiment causes the polarization separation layer 41 to separate the illumination light from the illumination optical system 1 into P-polarized light serving as the first illumination light and S-polarized light serving as the second illumination light in accordance with a difference between the polarization directions. Here, the polarization separation layer 41 of the PBS 40 has characteristics of reflecting the S-polarized light and transmitting the P-polarized light. The P-polarized light therefore enters the first light valve 31 and the S-polarized light enters the second light valve 32.

In the projector according to the fourth embodiment, the second image light generated by the second light valve 32 is configured as image light that passes through the polarization separation layer 41 of the PBS 40 toward the projection optical system 2. The second light valve 32 configured to have this image light that passes through the polarization separation layer 41 toward the projection optical system 2 is disposed on the right angle side in the one triangular prism 42 included in the PBS 40 (closer to the right angle side than the central position C1 of the triangular prism 42) unlike the case of the second light valve 32 illustrated in FIG. 5. In other words, the projector according to the fourth embodiment does not have the disposition position that satisfies the conditional expression (1) described above unlike the projector according to the second embodiment described above. The contrast is therefore decreased as compared with the projector according to the second embodiment described above.

In addition, in the projector according to the fourth embodiment, the first image light generated by the first light valve 31 is configured as image light that is reflected by the polarization separation layer 41 of the PBS 40 toward the projection optical system 2. The first light valve 31 configured to have this image light that is reflected by the polarization separation layer 41 toward the projection optical system 2 is disposed on the sharp angle side in another triangular prism included in the PBS 40 (closer to the sharp angle side than the central position of the other triangular prism).

Other components, operations, and effects may be substantially similar to those of the projector according to the first embodiment described above.

5. Fifth Embodiment

Next, a projector according to a fifth embodiment of the present disclosure is described. It is to be noted that the following denotes a component which is substantially the same as that of the projector according to any of the first to fourth embodiments described above with the same sign and omits description as appropriate.

FIG. 13 schematically illustrates a configuration example of the projector according to the fifth embodiment.

The projector according to the fifth embodiment further includes a region division polarizer 70 as compared with the projector according to the first embodiment described above.

The illumination optical system 1 of the projector according to the fifth embodiment emits an S-polarized component to the PBS 40 as the first polarized component as with the projector according to the first embodiment described above. In addition, the illumination optical system 1 emits a P-polarized component to the PBS 40 as the second polarized component. The first light valve 31 is disposed at a position at which the S-polarized component reflected by the polarization separation layer 41 of the PBS 40 is incident. The second light valve 32 is disposed at a position at which the P-polarized component passing through the polarization separation layer 41 of the PBS 40 is incident.

The PBS 40 of the projector according to the fifth embodiment causes the polarization separation layer 41 to separate the illumination light from the illumination optical system 1 into S-polarized light serving as the first illumination light and P-polarized light serving as the second illumination light in accordance with a difference between the polarization directions. Here, the polarization separation layer 41 of the PBS 40 has characteristics of reflecting the S-polarized light and transmitting the P-polarized light. The S-polarized light therefore enters the first light valve 31 and the P-polarized light enters the second light valve 32.

In the projector according to the fifth embodiment, the first image light generated by the first light valve 31 is configured as image light that passes through the polarization separation layer 41 of the PBS 40 toward the projection optical system 2. In addition, in the projector according to the fifth embodiment, the second image light generated by the second light valve 32 is configured as image light that is reflected by the polarization separation layer 41 of the PBS 40 toward the projection optical system 2.

The region division polarizer 70 is disposed between the PBS 40 and the projection optical system 2. The region division polarizer 70 is a polarizer that transmits only a desired polarized component. The region division polarizer 70 includes an S-polarized light cutting element 70S and a P-polarized light cutting element 70P.

The P-polarized light cutting element 70P is disposed on an optical path of the second image light generated by the second light valve 32. The S-polarized light cutting element 70S is disposed on an optical path of the first image light generated by the first light valve 31. The region division polarizer 70 may be disposed on an optical path of image light that is reflected by at least the polarization separation layer 41. In other words, in the configuration example illustrated in FIG. 13, the region division polarizer 70 may have a configuration in which only the P-polarized light cutting element 70P is disposed. In addition, the portion of the S-polarized light cutting element 70S may be a transparent substrate.

FIG. 14 illustrates an example of the characteristics of the PBS 40 in the projector according to the fifth embodiment.

Here, Ts represents the S-polarized component that is emitted from the first light valve 31 and passes through the polarization separation layer 41 of the PBS 40 and Tp represents the P-polarized component. In addition, Rs represents the S-polarized component that is emitted from the second light valve 32 and reflected by the polarization separation layer 41 of the PBS 40 and Rp represents the P-polarized component.

As illustrated in FIG. 14, it is possible to keep low the amount of light having the S-polarized light components Ts that pass through the polarization separation layer 41 of the PBS 40 because of the characteristics of the PBS 40. In contrast, it is difficult to keep low the amount of light having the P-polarized components Rp that are reflected by the polarization separation layer 41. The first image light from the first light valve 31 therefore exhibits favorable contrast characteristics because it is possible to secure a sufficient polarization ratio (Tp/Ts) in the PBS 40. In contrast, the second image light from the second light valve 32 exhibits unfavorable contrast characteristics because it is not possible to secure a sufficient polarization ratio (Rs/Rp) in the PBS 40 (it is difficult to suppress the reflectance of Rp). The P-polarized light cutting element 70P is thus disposed on an optical path of the second image light generated by the second light valve 32. This makes it possible to cut the unnecessary P-polarized component Rp and improve the polarization ratio of the second image light from the second light valve 32. This makes it possible to achieve both high efficiency and high contrast.

(Modification Examples)

FIG. 15 schematically illustrates a modification example of the projector according to the fifth embodiment.

The region division polarizer 70 may also be disposed in the projector according to any of the second to fourth embodiments described above. FIG. 15 illustrates a configuration example in which the region division polarizer 70 is disposed in the projector (FIG. 4) according to the second embodiment described above.

In the projector illustrated in FIG. 15, the second image light generated by the second light valve 32 is configured as image light that passes through the polarization separation layer 41 of the PBS 40 toward the projection optical system 2. In addition, the first image light generated by the first light valve 31 is configured as image light that is reflected by the polarization separation layer 41 of the PBS 40 toward the projection optical system 2.

In the projector illustrated in FIG. 15, the P-polarized light cutting element 70P is disposed on an optical path of the first image light generated by the first light valve 31. The S-polarized light cutting element 70S is disposed on an optical path of the second image light generated by the second light valve 32. In the projector illustrated in FIG. 15, the region division polarizer 70 may also be disposed on an optical path of image light that is reflected by at least the polarization separation layer 41. In other words, in the configuration example illustrated in FIG. 15, the region division polarizer 70 may have a configuration in which only the P-polarized light cutting element 70P is disposed. In addition, the portion of the S-polarized light cutting element 70S may be a transparent substrate.

Other components, operations, and effects may be substantially similar to those of the projector according to the first or second embodiment described above.

6. Sixth Embodiment

Next, a projector according to the sixth embodiment of the present disclosure is described. It is to be noted that the following denotes a component which is substantially the same as that of the projector according to any of the first to fifth embodiments described above with the same sign and omits description as appropriate.

In the sixth embodiment, a first specific configuration example of the illumination optical system 1 in the projector according to any of the first to fifth embodiments described above is described.

(Configuration)

FIG. 16 schematically illustrates a configuration example of the projector according to the sixth embodiment.

FIG. 16 illustrates a configuration example in which the illumination optical system 1A is applied in place of the illumination optical system 1 in the projector (FIG. 1) according to the first embodiment.

The illumination optical system 1A includes a region division phase difference plate 80, a first illumination optical system 101, and a second illumination optical system 102. In addition, the projector according to the sixth embodiment includes a fly eye lens 12 that is disposed between the condenser lens 11 and the second illumination optical system 102. The fly eye lens 12 is disposed near a second illumination system pupil P2.

The first illumination optical system 101 includes the plurality of condenser lenses 61 across the first illumination system pupil P1. The first illumination optical system 101 propagates the first illumination light toward the first illumination region A1 corresponding to the disposition position of the first light valve 31 and propagates the second illumination light toward the second illumination region A2 corresponding to the disposition position of the second light valve 32.

The region division phase difference plate 80 includes a phase difference plate region 81 and a transmission region 82. The region division phase difference plate 80 is disposed in a third illumination region A3 and a fourth illumination region A4. Alternatively, the region division phase difference plate 80 is disposed near the third illumination region A3 and the fourth illumination region A4. The phase difference plate region 81 is disposed in the fourth illumination region A4. Alternatively, the phase difference plate region 81 is disposed near the fourth illumination region A4. The phase difference plate region 81 is provided, for example, with a half-wave plate as a phase difference plate.

The transmission region 82 is disposed in the third illumination region A3. Alternatively, the transmission region 82 is disposed near the third illumination region A3. It is to be noted that the transmission region 82 is a transmission substrate that transmits illumination light. It is to be noted that a configuration may be adopted in which the region division phase difference plate 80 is provided in only a region corresponding to the fourth illumination region A4. In other words, the region division phase difference plate 80 may include only the phase difference plate region 81.

The third illumination region A3 is a region corresponding to the first illumination light. The third illumination region A3 is a region having a conjugate relationship with the first light valve 31 and the first illumination region A1. The fourth illumination region A4 is a region corresponding to the second illumination light. The fourth illumination region A4 is a region having a conjugate relationship with the second light valve 32 and the second illumination region A2.

It is to be noted that it is also possible to configure the first light valve 31 and the second light valve 32 to be illuminated with pieces of illumination light having wavelengths different from each other. In this case, the region division phase difference plate 80 includes a first phase difference plate region and a second phase difference plate region that provide phase differences which depend on the wavelengths.

The second illumination optical system 102 includes a plurality of condenser lenses 62. The second illumination optical system 102 emits pieces of uniform illumination light toward the third illumination region A3 and the fourth illumination region A4.

(Operation)

In the projector according to the sixth embodiment, the light source 10 is, for example, a laser light source that emits linearly-polarized light. The light source 10 emits, for example, light serving as S-polarized light to the PBS 40. Of the pieces of light emitted from the light source 10, light that converted by a collimator lens 11 into substantially parallel light enters the fly eye lens 12. The light emitted from the fly eye lens 12 goes through the second illumination optical system 102. The third illumination region A3 and the fourth illumination region A4 are hereby illuminated uniformly.

Light passing through the fourth illumination region A4 is provided with a phase difference of a ½ wavelength by the phase difference plate region 81 of the region division phase difference plate 80, converting S-polarized light into P-polarized light. The polarization state of light passing through the third illumination region A3 is maintained by the transmission region 82 of the region division phase difference plate 80. This converts the light having passed through the third illumination region A3 conjugate with the first light valve 31 into S-polarized light and converts the light having passed through the fourth illumination region A4 conjugate with the second light valve 32 into P-polarized light.

Here, the polarization separation layer 41 of the PBS 40 has characteristics of reflecting the S-polarized light and transmitting the P-polarized light. The S-polarized light therefore enters the first light valve 31 and the P-polarized light enters the second light valve 32. This causes the pieces of light emitted from the third illumination region A3 and the fourth illumination region A4 to go through the first illumination optical system 101 and propagates the S-polarized light to the first light valve 31 and propagates the P-polarized light to the second light valve 32.

The first light valve 31 and the second light valve 32 each control the polarization state of incident light for each of the pixels on the basis of an image signal. For example, in a case where display is performed in a certain pixel as an image signal at a luminance gradation of 70% of the amount of incident light, 70% of the incident light is emitted from the first light valve 31 as P-polarized light and emitted from the second light valve 32 as S-polarized light. The P-polarized light from the first light valve 31 and the S-polarized light from the second light valve 32 are synthesized by the PBS 40 and projected through the projection optical system 2 on the first display region D1 and the second display region D2. Meanwhile, the other 30% of the incident light is emitted from the first light valve 31 as S-polarized light and emitted from the second light valve 32 as P-polarized light. The S-polarized light from the first light valve 31 and the P-polarized light from the second light valve 32 are synthesized by the PBS 40 and return to the illumination optical system 1. In a case of a luminance gradation of 0%, all the amount of light return to the illumination optical system 1A.

Other components, operations, and effects may be substantially similar to those of the projector according to the first embodiment described above.

(Modification Examples)

The light source 10 may be configured to emit light serving as P-polarized light to the PBS 40. In this case, the phase difference plate region 81 of the region division phase difference plate 80 is disposed in the third illumination region A3. Alternatively, the phase difference plate region 81 of the region division phase difference plate 80 is disposed near the third illumination region A3. In addition, the transmission region 82 is disposed in the fourth illumination region A4. Alternatively, the transmission region 82 is disposed near the fourth illumination region A4.

In addition, the light source 10 may be configured to emit unpolarized light. In this case, the second illumination optical system 102 may be provided with an optical system therein that aligns the unpolarized light to S-polarized light or P-polarized light.

In addition, it is also possible to apply the illumination optical system 1A to the projector according to any of the second to fifth embodiments described above as the illumination optical system 1.

7. Seventh Embodiment

Next, a projector according to the seventh embodiment of the present disclosure is described. It is to be noted that the following denotes a component which is substantially the same as that of the projector according to any of the first to sixth embodiments described above with the same sign and omits description as appropriate.

In the seventh embodiment, a second specific configuration example of the illumination optical system 1 in the projector according to any of the first to fifth embodiments described above is described.

(Configuration)

FIG. 17 schematically illustrates a configuration example of the projector according to the seventh embodiment.

FIG. 17 illustrates a configuration example in which the illumination optical system 1B is applied in place of the illumination optical system 1 in the projector (FIG. 4) according to the second embodiment.

The illumination optical system 1B includes the front optical system 50B disposed to precede the first illumination system pupil P1 (light source 10 side) and the rear optical system 60 disposed to follow the first illumination system pupil P1 (PBS 40 side). The rear optical system 60 includes the plurality of condenser lenses 61.

FIG. 18 schematically illustrates a configuration example of the main portion of the illumination optical system 1B in the projector according to the seventh embodiment.

The front optical system 50B includes a phase difference plate array 90 and a fly eye lens 93 including a plurality of lenses.

The fly eye lens 93 is disposed in the first illumination system pupil P1. Alternatively, the fly eye lens 93 is disposed near the first illumination system pupil P1. In addition, the fly eye lens 93 is disposed at or near a position conjugate with the first light valve 31 and the second light valve 32.

The phase difference plate array 90 is disposed on the light incidence side of the fly eye lens 93. In addition, the phase difference plate array 90 is disposed at or near a position conjugate with the first light valve 31 and the second light valve 32. The phase difference plate array 90 is a region division optical element. The phase difference plate array 90 includes a phase difference plate region 91 and a transmission region 92. Each of the lenses of the fly eye lens 93 is provided with the phase difference plate region 91 and the transmission region 92. The phase difference plate region 91 is provided, for example, with a half-wave plate as a phase difference plate. The phase difference plate region 91 is disposed in a region in each of the plurality of lenses of the fly eye lens 93 corresponding to the second illumination light. In addition, the phase difference plate region 91 is disposed in or near a region having a conjugate relationship with the second light valve 32 and the second illumination region A2.

The transmission region 92 is a transmission substrate that transmits illumination light. The transmission region 92 is disposed in a region in each of the plurality of lenses of the fly eye lens 93 corresponding to the first illumination light. In addition, the transmission region 92 is disposed in or near a region having a conjugate relationship with the first light valve 31 and the first illumination region A1.

It is to be noted that it is also possible to configure the first light valve 31 and the second light valve 32 to be illuminated with pieces of illumination light having wavelengths different from each other. In this case, the region division phase difference plate 90 includes a first phase difference plate region and a second phase difference plate region that provide phase differences which depend on the wavelengths.

(Operation)

In the projector according to the seventh embodiment, the light source 10 is, for example, a laser light source that emits linearly-polarized light. The light source 10 emits, for example, light serving as P-polarized light to the PBS 40. Of the pieces of light emitted from the light source 10, light that converted by a collimator lens 11 into substantially parallel light enters the phase difference plate array 90 and then enters the fly eye lens 93. The light emitted from the fly eye lens 93 goes through the rear optical system 60 and the PBS 40. The first illumination region A1 and the second illumination region A2 are hereby illuminated uniformly.

The P-polarized light entering the phase difference plate array 90 disposed on the light incidence side of the fly eye lens 93 is provided with a phase difference of a ½ wavelength by the phase difference plate region 91 for each of the regions conjugate with the second illumination region A2 and is converted into S-polarized light with respect to the PBS 40. In addition, the polarization state of P-polarized light with respect to the PBS 40 is maintained by the transmission region 82 of the region division phase difference plate 80 for the P-polarized light entering the phase difference plate array 90 for each of the regions conjugate with the first illumination region A1. This converts light passing through the region conjugate with the first light valve 31 into P-polarized light and converts light passing through the region conjugate with the second light valve 32 into S-polarized light with respect to the PBS 40.

Next, of the pieces of light emitted from the fly eye lens 93, light having + polarity illustrated in FIG. 18 remains P-polarized with respect to the PBS 40 because the light passes through the region provided with no phase difference by the phase difference plate array 90. In contrast, light having − polarity illustrated in FIG. 18 is converted into S-polarized with respect to the PBS 40 because the light passes through the region provided with a phase difference of a ½ wavelength by the phase difference plate array 90.

Here, the polarization separation layer 41 of the PBS 40 has characteristics of reflecting the S-polarized light and transmitting the P-polarized light. Light having + polarity, which is a P-polarized component, is therefore propagated through the rear optical system 60 to cause the first illumination region A1 (first light valve 31) to be uniformly illuminated. In addition, light having − polarity, which is an S-polarized component, is propagated through the rear optical system 60 to cause the second illumination region A2 (second light valve 32) to be uniformly illuminated.

The first light valve 31 and the second light valve 32 each control the polarization state of incident light for each of the pixels on the basis of an image signal. For example, in a case where display is performed in a certain pixel as an image signal at a luminance gradation of 70% of the amount of incident light, 70% of the incident light is emitted from the first light valve 31 as S-polarized light and emitted from the second light valve 32 as P-polarized light. The S-polarized light from the first light valve 31 and the P-polarized light from the second light valve 32 are synthesized by the PBS 40 and projected through the projection optical system 2 on the first display region D1 and the second display region D2. Meanwhile, the other 30% of the incident light is emitted from the first light valve 31 as P-polarized light and emitted from the second light valve 32 as S-polarized light. The P-polarized light from the first light valve 31 and the S-polarized light from the second light valve 32 are synthesized by the PBS 40 and return to the illumination optical system 1. In a case of a luminance gradation of 0%, all the amount of light return to the illumination optical system 1B.

Other components, operations, and effects may be substantially similar to those of the projector according to the second embodiment described above.

(Modification Examples)

The light source 10 may be configured to emit light serving as S-polarized light to the PBS 40. In this case, the phase difference plate region 91 of the phase difference plate array 90 is disposed for each of the regions conjugate with the first illumination region A1.

In addition, the light source 10 may be configured to emit unpolarized light. In this case, preceding the phase difference plate array 90, there may be provided an optical system that aligns the non-polarized light to P-polarized light or S-polarized light.

In addition, the fly eye lens 93 may include a pair of fly eye lenses disposed to be opposed to each other.

In addition, it is also possible to apply the illumination optical system 1B to the projector according to any of the first and third to fifth embodiments described above as the illumination optical system 1.

8. Eighth Embodiment

Next, a projector according to the eighth embodiment of the present disclosure is described. It is to be noted that the following denotes a component which is substantially the same as that of the projector according to any of the first to seventh embodiments described above with the same sign and omits description as appropriate.

In the eighth embodiment, a third specific configuration example of the illumination optical system 1 in the projector according to any of the first to fifth embodiments described above is described.

(Configuration)

FIG. 19 schematically illustrates a configuration example of the projector according to the eighth embodiment.

FIG. 19 illustrates a configuration example in which the illumination optical system 1C is applied in place of the illumination optical system 1 in the projector (FIG. 15) according to the modification example of the fifth embodiment.

The illumination optical system 1C includes the front optical system 50C disposed to precede the first illumination system pupil P1 (light source 10 side) and the rear optical system 60 disposed to follow the first illumination system pupil P1 (PBS 40 side). The rear optical system 60 includes the plurality of condenser lenses 61.

FIG. 20 schematically illustrates a configuration example of the main portion of the illumination optical system 1C in the projector according to the eighth embodiment.

The front optical system 50C includes a PBS array 110 and a fly eye lens 113 including a plurality of lenses.

The fly eye lens 113 is disposed on the light incidence side of the PBS array 110.

The PBS array 110 is disposed on the light emission side of the fly eye lens 113. The PBS array 110 includes a plurality of prisms 111 included in the PBS. The light emission sides of the plurality of prisms 111 are alternately provided with phase difference plates 112. Each of the phase difference plates 112 is, for example, a half-wavelength plate.

FIG. 21 schematically illustrates a configuration example of a polarization conversion element (PS converter) 120 serving as a comparative example for the PBS array 110 in the projector according to the eighth embodiment.

As with the PBS array 110, the polarization conversion element 120 includes the plurality of prisms 111 included in the PBS and the phase difference plate 112 provided for every other prism 111. The polarization conversion element 120 is an element that aligns the polarization of incident light, for example, to a P-polarized component. In contrast, the PBS array 110 is an angle separator that separates illumination light into the first polarized component corresponding to the first illumination light and the second polarized component corresponding to the second illumination light on the basis of a difference between the angles of incidence and emits the first polarized component and the second polarized component at emission angles different from each other. In the polarization conversion element 120 and the PBS array 110, the positional relationships between the individual lenses of the fly eye lens 113, and the prism 111 and the phase difference plate 112 are different.

(Operation)

In the projector according to the eighth embodiment, the light source 10 is a light source such as LED or a phosphor light source that emits unpolarized light. Here, the light source 10 emits light having both components of S-polarized light and P-polarized light to the PBS 40. Of the pieces of light emitted from the light source 10, light that converted by the collimator lens 11 into substantially parallel light enters the fly eye lens 113 and then enters the PBS array 110. The light emitted from the PBS array 110 goes through the rear optical system 60 and the PBS 40. The first illumination region A1 and the second illumination region A2 are hereby illuminated uniformly.

In the PBS array 110 disposed on the emission side of the fly eye lens 113, the S-polarized light and the P-polarized light having entered the PBS array 110 are separated as follows. The S-polarized light and the P-polarized light each enter the region in which the phase difference plate 112 is disposed or the region in which the phase difference plate 112 is not disposed to determine polarization. The following describes optical paths L1 to L4 illustrated in FIG. 20.

(Optical Path L1)

The S-polarized light entering the PBS array 110 is reflected by the polarization separation layer of the one certain prism 111 and enters the adjacent prism 111. Further, the S-polarized light is reflected by the polarization separation layer and emitted. Among them, the light passing through the region conjugate with the first light valve 31 in the fly eye lens 113 is light having + polarity illustrated in FIG. 20 and passes through the region provided with a phase difference of a ½ wavelength by the phase difference plate 112. The light is thus converted into P-polarized light and emitted to the PBS 40.

(Optical Path L2)

The S-polarized light entering the PBS array 110 is reflected by the polarization separation layer of the one certain prism 111 and enters the adjacent prism 111. Further, the S-polarized light is reflected by the polarization separation layer and emitted. Among them, the light passing through the region conjugate with the second light valve 32 in the fly eye lens 113 is light having − polarity illustrated in FIG. 20 and passes through the region that is not provided with a phase difference by the phase difference plate 112. The light is thus emitted to the PBS 40 as S-polarized light.

(Optical Path L3)

The P-polarized light entering the PBS array 110 passes through the polarization separation layer of the one same prism 111 and is emitted as it is. Among them, the light passing through the region conjugate with the first light valve 31 in the fly eye lens 113 is light having + polarity illustrated in FIG. 20 and passes through the region that is not provided with a phase difference by the phase difference plate 112. The light is thus emitted to the PBS 40 as P-polarized light.

(Optical Path L4)

The P-polarized light entering the PBS array 110 passes through the polarization separation layer of the one same prism 111 and is emitted as it is. Among them, the light passing through the region conjugate with the second light valve 32 in the fly eye lens 113 is light having − polarity illustrated in FIG. 20 and passes through the region provided with a phase difference of a ½ wavelength by the phase difference plate 112. The light is thus converted into S-polarized light and emitted to the PBS 40.

Here, the polarization separation layer 41 of the PBS 40 has characteristics of reflecting the S-polarized light and transmitting the P-polarized light. Light having + polarity, which is a P-polarized component, is therefore propagated through the rear optical system 60 to cause the first illumination region A1 (first light valve 31) to be uniformly illuminated. In addition, light having − polarity, which is an S-polarized component, is propagated through the rear optical system 60 to cause the second illumination region A2 (second light valve 32) to be uniformly illuminated.

The first light valve 31 and the second light valve 32 each control the polarization state of incident light for each of the pixels on the basis of an image signal. For example, in a case where display is performed in a certain pixel as an image signal at a luminance gradation of 70% of the amount of incident light, 70% of the incident light is emitted from the first light valve 31 as S-polarized light and emitted from the second light valve 32 as P-polarized light. The S-polarized light from the first light valve 31 and the P-polarized light from the second light valve 32 are synthesized by the PBS 40 and projected through the projection optical system 2 on the first display region D1 and the second display region D2. Meanwhile, the other 30% of the incident light is emitted from the first light valve 31 as P-polarized light and emitted from the second light valve 32 as S-polarized light. The P-polarized light from the first light valve 31 and the S-polarized light from the second light valve 32 are synthesized by the PBS 40 and return to the illumination optical system 1. In a case of a luminance gradation of 0%, all the amount of light return to the illumination optical system 1C.

Other components, operations, and effects may be substantially similar to those of the projector according to the modification example of the fifth embodiment described above.

(Modification Examples)

The light source 10 may be configured to emit linearly-polarized light (S-polarized light or P-polarized light with respect to the PBS 40) like a laser light source. In this case, the light passes through the optical path that the S-polarized light (or the P-polarized light) in the PBS array 110 described above has entered. It is possible to uniformly illuminate the first light valve 31 and the second light valve 32 in accordance with a similar principle.

The fly eye lens 113 may include a pair of fly eye lenses disposed to be opposed to each other.

In addition, it is also possible to apply the illumination optical system 1C to a projector other than the projector according to the modification example of the fifth embodiment as the illumination optical system 1 among the projectors according to the first to fifth embodiments described above.

9. Ninth Embodiment

Next, a projector according to the ninth embodiment of the present disclosure is described. It is to be noted that the following denotes a component which is substantially the same as that of the projector according to any of the first to eighth embodiments described above with the same sign and omits description as appropriate.

In the ninth embodiment, a fourth specific configuration example of the illumination optical system 1 in the projector according to any of the first to fifth embodiments described above is described.

(Configuration)

FIG. 22 schematically illustrates a configuration example of the projector according to the ninth embodiment. The projector according to the ninth embodiment includes the region division polarizer 70 that is disposed between the PBS 40 and the projection optical system 2 as with the projector (FIG. 13) according to the fifth embodiment.

FIG. 22 illustrates a configuration example in which the illumination optical system 1D is applied in place of the illumination optical system 1 in the projector (FIG. 11) according to the third embodiment.

The illumination optical system 1D includes the front optical system 50D disposed to precede the first illumination system pupil P1 (light source 10 side) and the rear optical system 60 disposed to follow the first illumination system pupil P1 (PBS 40 side). The rear optical system 60 includes the plurality of condenser lenses 61.

The light source 10 and the collimator lens 11 are disposed to cause light to obliquely enter the front optical system 50D.

FIG. 23 schematically illustrates a configuration example of the main portion of the illumination optical system 1D in the projector according to the ninth embodiment.

The front optical system 50D includes a polarization selectivity element 130 and a fly eye lens 133 including a plurality of lenses.

The fly eye lens 133 is disposed on the light emission side of the polarization selectivity element 130.

The polarization selectivity element 130 is disposed on the light incidence side of the fly eye lens 133. The polarization selectivity element 130 is an element that separates illumination light into the first polarized component corresponding to the first illumination light and the second polarized component corresponding to the second illumination light on the basis of a difference between the polarization directions and emits the first polarized component and the second polarized component at emission angles different from each other.

FIG. 24 schematically illustrates a first example of the polarization selectivity element 130 in the projector according to the ninth embodiment. FIG. 25 schematically illustrates a second example of the polarization selectivity element 130 in the projector according to the ninth embodiment.

The polarization selectivity element 130 may be a polarization diffraction element. The polarization selectivity element 130 may be a transmissive blazed grating 131 having an uneven shape in which a plurality of strip-shaped blazed protrusions is disposed in parallel on one surface, for example, as illustrated in FIG. 24. In addition, the polarization selectivity element 130 may be a transmissive stepped diffraction element 132 having an uneven shape in which a plurality of strip-shaped stepped protrusions is disposed in parallel on one surface, for example, as illustrated in FIG. 25.

In addition, a binary polarization diffraction element or a polarization refraction element having refractive index anisotropy may be used as the polarization selectivity element 130.

(Operation)

In the projector according to the ninth embodiment, the light source 10 is a light source such as LED or a phosphor light source that emits unpolarized light. Here, the light source 10 emits light having both components of S-polarized light and P-polarized light to the PBS 40. Of the pieces of light emitted from the light source 10, light that converted by the collimator lens 11 into substantially parallel light enters the polarization selectivity element 130 and then enters the fly eye lens 133. The light emitted from the fly eye lens 133 goes through the rear optical system 60 and the PBS 40. The first illumination region A1 and the second illumination region A2 are hereby illuminated uniformly.

The polarization selectivity element 130 is, for example, a polarization diffraction element. The workings of diffraction and the workings of transmission are different in accordance with the polarization of incident light. In the example of FIG. 23, the incident S-polarized light and P-polarized light are separated as follows.

The S-polarized light entering the polarization selectivity element 130 is diffracted and converted by the fly eye lens 133 into light that propagates in the + polarity direction as illustrated in FIG. 23.

In contrast, the P-polarized light entering the polarization selectivity element 130 is transmitted and converted by the fly eye lens 133 into light that propagates in the − polarity direction as illustrated in FIG. 23.

In the example of FIG. 23, the light emitted from the collimator lens 11 is made to obliquely enter the polarization selectivity element 130. This achieves the switching between diffracted light and transmitted light in accordance with polarity.

Here, the polarization separation layer 41 of the PBS 40 has characteristics of reflecting the S-polarized light and transmitting the P-polarized light. Light having + polarity, which is an S-polarized component, is therefore propagated through the rear optical system 60 to cause the first illumination region A1 (first light valve 31) to be uniformly illuminated. In addition, light having − polarity, which is a P-polarized component, is propagated through the rear optical system 60 to cause the second illumination region A2 (second light valve 32) to be uniformly illuminated.

The projector according to the ninth embodiment does not have to include the phase difference plate 112 as used for the illumination optical system 1C in the projector according to the eighth embodiment. The phase difference plate 112 usually includes a resin and it is thus disadvantageous in terms of durability and life. In contrast, the projector according to the ninth embodiment does not have to include the phase difference plate 112, making it possible to achieve high durability and long life.

Other components, operations, and effects may be substantially similar to those of the projector according to the third or fifth embodiment described above.
(Modification Examples)

The light source 10 may be configured to emit linearly-polarized light (elliptically-polarized light having S -polarized components and P-polarized components with respect to the PBS 40 at a substantially equal ratio or linearly-polarized light at 45 degrees with respect to the PBS 40) like a laser light source. In this case, the light passes through the optical path that the S-polarized light (or the P-polarized light) in the PBS array 110 described above has entered. It is possible to uniformly illuminate the first light valve 31 and the second light valve 32 in accordance with a similar principle.

The fly eye lens 133 may include a pair of fly eye lenses disposed to be opposed to each other.

In addition, it is also possible to apply the illumination optical system 1D to a projector other than the projector according to the third embodiment as the illumination optical system 1 among the projectors according to the first to fifth embodiments described above.

10. Tenth Embodiment

Next, a projector according to the tenth embodiment of the present disclosure is described. It is to be noted that the following denotes a component which is substantially the same as that of the projector according to any of the first to ninth embodiments described above with the same sign and omits description as appropriate.

In the tenth embodiment, a fifth specific configuration example of the illumination optical system 1 in the projector according to any of the first to fifth embodiments described above is described.
(Configuration)

FIG. 26 schematically illustrates a configuration example of the projector according to the tenth embodiment.

FIG. 26 schematically illustrates a configuration example of the projector according to the tenth embodiment. The projector according to the tenth embodiment includes the region division polarizer 70 that is disposed between the PBS 40 and the projection optical system 2 as with the projector (FIG. 13) according to the fifth embodiment.

FIG. 26 illustrates a configuration example in which the illumination optical system 1E is applied in place of the illumination optical system 1 in the projector (FIG. 11) according to the third embodiment.

The illumination optical system 1E includes the front optical system 50E disposed to precede the first illumination system pupil P1 (light source 10 side) and the rear optical system 60 disposed to follow the first illumination system pupil P1 (PBS 40 side). The rear optical system 60 includes the plurality of condenser lenses 61.

FIG. 27 schematically illustrates a configuration example of the main portion of the illumination optical system 1E in the projector according to the tenth embodiment.

The front optical system 50E includes an optical element array 140 and a fly eye lens 143 including a plurality of lenses.

The fly eye lens 143 is disposed on the light incidence side of the optical element array 140.

The optical element array 140 is disposed on the light emission side of the fly eye lens 143. The optical element array 140 includes PBS array 141 and a wedge-shaped optical element 142.

The PBS array 141 includes a plurality of prisms included in the PBS. The light emission sides of the plurality of respective prisms are alternately provided with the wedge-shaped optical elements 142 whose directions are opposite.

The PBS array 141 is a polarization separator that separates illumination light into the first polarized component corresponding to the first illumination light and the second polarized component corresponding to the second illumination light on the basis of a difference between the polarization directions.

The wedge-shaped optical element 142 emits the first polarized component and the second polarized component separated by the PBS array 141 at emission angles different from each other.
(Operation)

In the projector according to the tenth embodiment, the light source 10 is a light source such as LED or a phosphor light source that emits unpolarized light. Here, the light source 10 emits light having both components of S-polarized light and P-polarized light to the PBS 40. Of the pieces of light emitted from the light source 10, light that converted by the collimator lens 11 into substantially parallel light enters the fly eye lens 143 and then enters the optical element array 140. The light emitted from the optical element array 140 goes through the rear optical system 60 and the PBS 40. The first illumination region A1 and the second illumination region A2 are hereby illuminated uniformly.

In the PBS array 141 disposed near the emission side of the fly eye lens 143, the S-polarized light and the P-polarized light having entered the PBS array 141 are separated as follows. The S-polarized light and the P-polarized light each enter the corresponding region of the wedge-shaped optical element 142 to determine the polarization.

The S-polarized light entering the PBS array 141 is reflected by the polarization separation layer of one certain prism and then enters the adjacent prism. Further, the S-polarized light is reflected by the polarization separation layer and emitted. After that, the light is refracted as S-polarized light in the + polarity direction illustrated in FIG. 27 by the wedge-shaped optical element 142.

The P-polarized light entering the PBS array 141 passes through the polarization separation layer of the one same prism and is emitted as it is. After that, the light is refracted as P-polarized light in the − polarity direction illustrated in FIG. 27 by the wedge-shaped optical element 142.

Here, the polarization separation layer 41 of the PBS 40 has characteristics of reflecting the S-polarized light and transmitting the P-polarized light. Light having + polarity, which is an S-polarized component, is therefore propagated through the rear optical system 60 to cause the first illumination region A1 (first light valve 31) to be uniformly illuminated. In addition, light having − polarity, which is a P-polarized component, is propagated through the rear optical system 60 to cause the second illumination region A2 (second light valve 32) to be uniformly illuminated.

The projector according to the tenth embodiment does not have to include the phase difference plate 112 as used for the illumination optical system 1C in the projector according to the eighth embodiment and the polarization selectivity element 130 as used for the illumination optical system 1D in the projector according to the ninth embodiment. The phase difference plate 112 and the polarization selectivity element 130 usually each include a resin and it is thus disadvantageous in terms of durability and life. In contrast, the projector according to the tenth embodiment does not have to include the phase difference plate 112 and the polarization selectivity element 130, making it possible to achieve high durability and long life.

Other components, operations, and effects may be substantially similar to those of the projector according to the third or fifth embodiment described above.

(Modification Examples)

The light source 10 and the collimator lens 11 may be disposed to cause light to obliquely enter the front optical system 50E. In this case, the light emission sides of the plurality of prisms of the PBS array 141 may be alternatively provided with the wedge-shaped optical elements 142. In this case, a P-polarized component has − polarity without going through the wedge-shaped optical element 142 and an S-polarized component has + polarity because of the wedge-shaped optical element 142. In this case, the second light valve 32 is illuminated with the P-polarized component and the first light valve 31 is illuminated with the S-polarized component.

In addition, in the configuration illustrated in FIG. 27, the wedge-shaped optical elements 142 may be disposed to cause S-polarized light to have − polarity and cause P-polarized light to have + polarity.

The fly eye lens 143 may include a pair of fly eye lenses disposed to be opposed to each other.

In addition, it is also possible to apply the illumination optical system 1E to a projector other than the projector according to the third embodiment as the illumination optical system 1 among the projectors according to the first to fifth embodiments described above.

11. Other Embodiments

The technology according to the present disclosure is not limited to the description of each of the embodiments described above. A variety of modifications are possible.

For example, the present technology may also have configurations as follows.

According to the present technology having the following configurations, the illumination light from the illumination optical system is separated into the first illumination light and the second illumination light, the first image light is generated by using the separated first illumination light, and the second image light is generated by using the separated second illumination light. The generated first image light and second image light enter the projection optical system. The first image light is projected toward the first display region and the second image light is projected toward the second display region. This makes it possible to perform display in a variety of modes at a small size.

[1]
A projector including:
an illumination optical system that generates illumination light;
a separator that separates the illumination light from the illumination optical system into first illumination light and second illumination light;
a first light valve that is illuminated with the first illumination light separated by the separator and generates first image light;
a second light valve that is illuminated with the second illumination light separated by the separator and generates second image light; and
a projection optical system that the first image light generated by the first light valve and the second image light generated by the second light valve enter through the separator, the projection optical system projecting the first image light that has entered the projection optical system toward a first display region and projecting the second image light that has entered the projection optical system toward a second display region.

[2]
The projector according to [1], in which
the separator includes a polarization separator including a polarization separation layer,
any one of the first image light or the second image light is configured as image light that passes through the polarization separation layer toward the projection optical system, the first image light being generated by the first light valve, the second image light being generated by the second light valve, and
in a case where L represents a distance from an incidence surface to an emission surface of the polarization separator for the image light passing through the polarization separation layer and d represents a distance from the incidence surface of the polarization separator for the image light passing through the polarization separation layer to the polarization separation layer, the following conditional expression (1) is satisfied.

$$d \leq L/2 \quad (1)$$

[3]
The projector according to [1] or [2], further including a polarizer that is disposed between the separator and the projection optical system and transmits only a desired polarized component, in which
the separator includes a polarization separator including a polarization separation layer,
any one of the first image light or the second image light is configured as image light that is reflected by the polarization separation layer toward the projection optical system, the first image light being generated by the first light valve, the second image light being generated by the second light valve, and
the polarizer is disposed on an optical path of the image light that is reflected by at least the polarization separation layer.

[4]
The projector according to any one of [1] to [3], in which the illumination optical system includes a phase difference plate that is disposed at or near a position conjugate with any one of the first light valve or the second light valve.

[5]
The projector according to [4], in which the phase difference plate is disposed in a region in the illumination optical system, the region corresponding to illumination light of any one of the first illumination light or the second illumination light.

[6]
The projector according to [4], in which
the illumination optical system further includes a fly eye lens that is disposed at or near a position conjugate with the first light valve and the second light valve and includes a plurality of lenses, and
the phase difference plate is disposed in a region in each of the plurality of lenses, the region corresponding to illumination light of any one of the first illumination light or the second illumination light.

[7]
The projector according to any one of [1] to [3], in which the illumination optical system includes an angle separator that separates the illumination light into a first polarized component and a second polarized component on the basis of a difference between angles of incidence and emits the first polarized component and the second polarized component at emission angles different from each other, the first polarized component corresponding to the first illumination light, the second polarized component corresponding to the second illumination light.

[8]
The projector according to any one of [1] to [3], in which the illumination optical system includes a polarization selectivity element that separates the illumination light into a first polarized component and a second polarized component on the basis of a difference between polarization directions and emits the first polarized component and the second polarized component at emission angles different from each other, the first polarized component corresponding to the first illumination light, the second polarized component corresponding to the second illumination light.

[9]
The projector according to any one of [1] to [3], in which the illumination optical system includes
a polarization separator that separates the illumination light into a first polarized component and a second polarized component on the basis of a difference between polarization directions, the first polarized component corresponding to the first illumination light, the second polarized component corresponding to the second illumination light, and
a wedge-shaped optical element that emits the first polarized component and the second polarized component separated by the polarization separator at emission angles different from each other.

This application claims the priority on the basis of Japanese Patent Application No. 2020-74073 filed on Apr. 17, 2020 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. A projector, comprising:
an illumination optical system configured to generate illumination light;
a separator configured to separate the illumination light from the illumination optical system into first illumination light and second illumination light;
a first light valve that is illuminated with the first illumination light separated by the separator, wherein the first light valve is configured to generate first image light;
a second light valve that is illuminated with the second illumination light separated by the separator, wherein the second light valve is configured to generate second image light;
a projection optical system configured to:
receive the first image light and the second image light through the separator; and
project the first image light that has entered the projection optical system toward a first display region and project the second image light that has entered the projection optical system toward a second display region; and
a polarizer between the separator and the projection optical system, wherein
the polarizer is configured to transmit a desired polarized component,
the separator includes a polarization separator,
the polarization separator includes a polarization separation layer configured to reflect one of the first image light or the second image light toward the projection optical system, and
the polarizer is on an optical path of the image light that is reflected by at least the polarization separation layer.

2. The projector according to claim 1, wherein
in a case where L represents a distance from an incidence surface to an emission surface of the polarization separator for the image light passing through the polarization separation layer and d represents a distance from the incidence surface of the polarization separator for the image light passing through the polarization separation layer to the polarization separation layer, following conditional expression (1) is satisfied $$d \leq L/2 \qquad (1).$$

3. The projector according to claim 1, wherein
the illumination optical system includes a phase difference plate, and
the phase difference plate is at or near a first position conjugate with one of the first light valve or the second light valve.

4. The projector according to claim 3, wherein
the phase difference plate is in a region in the illumination optical system, and
the region corresponds to one of the first illumination light or the second illumination light.

5. The projector according to claim 3, wherein
the illumination optical system further includes a fly eye lens at or near a second position conjugate with the first light valve and the second light valve,
the fly eye lens includes a plurality of lenses,
the phase difference plate is in a region in each of the plurality of lenses, and
the region corresponds to one of the first illumination light or the second illumination light.

6. The projector according to claim 1, wherein the illumination optical system includes an angle separator configured to:
separate the illumination light into a first polarized component and a second polarized component based on a difference between a first angle of incidence corresponding to the first illumination light and a second angle of incidence corresponding to the second illumination light; and
emit the first polarized component at a first emission angle and the second polarized component at a second emission angle different from the first emission angle, wherein the first polarized component corresponds to the first illumination light and the second polarized component corresponds to the second illumination light.

7. The projector according to claim 1, wherein the illumination optical system includes a polarization selectivity element configured to:
  separate the illumination light into a first polarized component and a second polarized component based on a difference between a first polarization direction corresponding to the first illumination light and a second polarization direction corresponding to the second illumination light; and
  emit the first polarized component at a first emission angle and the second polarized component at a second emission angle different from the first emission angle, wherein the first polarized component corresponds to the first illumination light and the second polarized component corresponding to the second illumination light.

8. The projector according to claim 1, wherein the illumination optical system includes:
  a polarization separator configured to separate the illumination light into a first polarized component and a second polarized component based on a difference between a first polarization direction corresponding to the first illumination light and a second polarization direction corresponding to the second illumination light, wherein the first polarized component corresponds to the first illumination light and the second polarized component corresponds to the second illumination light; and
  a wedge-shaped optical element configured to emit the first polarized component at a first emission angle and the second polarized component at a second emission angle different from the first emission angle.

* * * * *